(12) United States Patent
Atkins et al.

(10) Patent No.: US 12,543,799 B2
(45) Date of Patent: Feb. 10, 2026

(54) VAPORIZER DEVICE WITH CHARGING AND REVERSE-CHARGING CAPABILITY

(71) Applicant: JUUL Labs, Inc., Washington, DC (US)

(72) Inventors: Ariel Atkins, San Francisco, CA (US); Mackenzie Paige Belt, San Francisco, CA (US); Brandon Cheung, San Francisco, CA (US); Steven Christensen, Burlingame, CA (US); Kevin Lomeli, San Francisco, CA (US); Claire O'Malley, San Francisco, CA (US); Nihir B. Shah, San Francisco, CA (US)

(73) Assignee: JUUL Labs, Inc., Washington, DC (US)

( * ) Notice: Subject to any disclaimer, the term of this patent is extended or adjusted under 35 U.S.C. 154(b) by 553 days.

(21) Appl. No.: 17/350,215

(22) Filed: Jun. 17, 2021

(65) Prior Publication Data
US 2022/0046997 A1 Feb. 17, 2022

Related U.S. Application Data

(63) Continuation of application No. PCT/US2019/067263, filed on Dec. 18, 2019.
(Continued)

(51) Int. Cl.
*A24F 40/90* (2020.01)
*A24F 40/42* (2020.01)
(Continued)

(52) U.S. Cl.
CPC .............. *A24F 40/90* (2020.01); *A24F 40/42* (2020.01); *A24F 40/51* (2020.01); *A24F 40/65* (2020.01);
(Continued)

(58) Field of Classification Search
CPC .......... A24F 40/90; A24F 40/42; A24F 40/51; A24F 40/65; A24F 40/40; A24F 40/50;
(Continued)

(56) References Cited

U.S. PATENT DOCUMENTS 5,060,671 A 10/1991 Counts et al.
5,144,962 A 9/1992 Counts et al.
(Continued)

FOREIGN PATENT DOCUMENTS

AU 2017202891 B2 5/2019
CN 203618789 U 6/2014
(Continued)

*Primary Examiner* — Justin M Kratt
(74) *Attorney, Agent, or Firm* — Mintz Levin Cohn Ferris Glovsky and Popeo, P.C.

(57) ABSTRACT

A vaporizer may include a vaporizer body configured to couple with a vaporizer cartridge including a vaporizable material. The vaporizer body may include a first power source configured to discharge a current to a heating element in order to cause a vaporization of at least a portion of the vaporizable material included in the vaporizer cartridge by at least increasing a temperature of the heating element. The vaporizer configured to engage in a reverse charging with a device in which the first power source of the vaporizer charges or is charged by a second power source at the device. Various embodiments of the vaporizer cartridge are provided.

19 Claims, 8 Drawing Sheets

Related U.S. Application Data

(60) Provisional application No. 62/781,587, filed on Dec. 18, 2018.

(51) Int. Cl.
| | | |
|---|---|---|
| *A24F 40/51* | (2020.01) | |
| *A24F 40/65* | (2020.01) | |
| *H02J 7/00* | (2006.01) | |
| *H02J 7/34* | (2006.01) | |
| *H02J 50/10* | (2016.01) | |
| A24F 40/40 | (2020.01) | |
| A24F 40/50 | (2020.01) | |
| A24F 40/95 | (2020.01) | |

(52) U.S. Cl.
CPC ............ *H02J 7/0042* (2013.01); *H02J 7/342* (2020.01); *H02J 50/10* (2016.02); *A24F 40/40* (2020.01); *A24F 40/50* (2020.01); *A24F 40/95* (2020.01); *H02J 7/0047* (2013.01); *H02J 7/0048* (2020.01); *H02J 7/0049* (2020.01); *H02J 7/005* (2020.01); *H02J 7/0063* (2013.01)

(58) Field of Classification Search
CPC .......... A24F 40/95; H02J 7/0042; H02J 7/342; H02J 50/10; H02J 7/0047; H02J 7/0048; H02J 7/0049; H02J 7/005; H02J 7/0063
See application file for complete search history.

(56) References Cited

U.S. PATENT DOCUMENTS

| | | |
|---|---|---|
| 5,269,327 A | 12/1993 | Counts et al. |
| 8,371,310 B2 | 2/2013 | Brenneise |
| 8,528,569 B1 | 9/2013 | Newton |
| 8,820,330 B2 | 9/2014 | Bellinger et al. |
| 8,881,737 B2 | 11/2014 | Collett et al. |
| 8,897,628 B2 | 11/2014 | Conley et al. |
| 9,004,073 B2 | 4/2015 | Tucker et al. |
| 9,018,899 B2 | 4/2015 | Xiang |
| 9,095,175 B2 | 8/2015 | Terry et al. |
| 9,247,773 B2 | 2/2016 | Memari et al. |
| 9,289,014 B2 | 3/2016 | Tucker et al. |
| 9,399,110 B2 | 7/2016 | Goodman et al. |
| 9,423,152 B2 | 8/2016 | Ampolini et al. |
| 9,427,022 B2 | 8/2016 | Levin et al. |
| 9,439,455 B2 | 9/2016 | Alarcon et al. |
| 9,549,573 B2 | 1/2017 | Monsees et al. |
| 9,648,908 B1 | 5/2017 | Rinehart et al. |
| 9,681,688 B1 | 6/2017 | Rinehart et al. |
| 9,723,876 B2 | 8/2017 | Cadieux et al. |
| 9,743,691 B2 | 8/2017 | Minskoff et al. |
| 9,806,549 B2 | 10/2017 | Liberti et al. |
| 9,854,839 B2 | 1/2018 | Tucker et al. |
| 9,936,733 B2 | 4/2018 | Ampolini et al. |
| 10,004,259 B2 | 6/2018 | Sebastian et al. |
| 10,028,537 B1 | 7/2018 | Hawes et al. |
| 10,034,988 B2 | 7/2018 | Wensley et al. |
| 10,058,129 B2 | 8/2018 | Monsees et al. |
| 10,080,387 B2 | 9/2018 | Phillips et al. |
| 10,085,481 B2 | 10/2018 | Verleur et al. |
| 10,090,693 B2 | 10/2018 | Alarcon |
| 10,104,915 B2 | 10/2018 | Bowen et al. |
| 10,130,123 B2 | 11/2018 | Hatton et al. |
| 10,131,532 B2 | 11/2018 | Murison et al. |
| 10,159,282 B2 | 12/2018 | Monsees et al. |
| 10,188,148 B2 | 1/2019 | Althorpe et al. |
| 10,201,186 B2 | 2/2019 | Alarcon et al. |
| 10,276,898 B2 | 4/2019 | Leadley |
| 10,285,444 B2 | 5/2019 | Clemens et al. |
| 10,292,427 B2 | 5/2019 | Cameron et al. |
| 10,314,343 B2 | 6/2019 | Newcomb et al. |
| 10,357,060 B2 | 7/2019 | Rostami et al. |
| 10,368,580 B2 | 8/2019 | Rostami et al. |
| 10,383,368 B2 | 8/2019 | Larson |
| 10,405,579 B2 | 9/2019 | Collett et al. |
| 10,512,282 B2 | 12/2019 | Bowen et al. |
| 2010/0031968 A1 | 2/2010 | Sheikh et al. |
| 2010/0181387 A1 | 7/2010 | Zaffaroni et al. |
| 2010/0253281 A1 | 10/2010 | Li |
| 2011/0040235 A1 | 2/2011 | Castel |
| 2013/0213418 A1 | 8/2013 | Tucker et al. |
| 2013/0255702 A1 | 10/2013 | Griffith et al. |
| 2013/0284192 A1* | 10/2013 | Peleg ................. A24F 40/53 131/329 |
| 2013/0306064 A1 | 11/2013 | Thorens et al. |
| 2013/0319439 A1 | 12/2013 | Gorelick et al. |
| 2013/0340775 A1 | 12/2013 | Juster et al. |
| 2014/0041655 A1 | 2/2014 | Barron et al. |
| 2014/0041658 A1 | 2/2014 | Goodman et al. |
| 2014/0096781 A1 | 4/2014 | Sears et al. |
| 2014/0096782 A1 | 4/2014 | Ampolini et al. |
| 2014/0190496 A1 | 7/2014 | Wensley et al. |
| 2014/0224267 A1 | 8/2014 | Levitz et al. |
| 2014/0238422 A1 | 8/2014 | Plunkett et al. |
| 2014/0238423 A1 | 8/2014 | Tucker et al. |
| 2014/0238424 A1 | 8/2014 | Macko et al. |
| 2014/0261486 A1 | 9/2014 | Potter et al. |
| 2014/0261488 A1 | 9/2014 | Tucker |
| 2014/0261490 A1 | 9/2014 | Kane |
| 2014/0261492 A1 | 9/2014 | Kane et al. |
| 2014/0261493 A1 | 9/2014 | Smith et al. |
| 2014/0283855 A1 | 9/2014 | Hawes et al. |
| 2014/0299137 A1 | 10/2014 | Kieckbusch et al. |
| 2014/0366898 A1 | 12/2014 | Monsees et al. |
| 2014/0373857 A1 | 12/2014 | Steinberg |
| 2015/0020823 A1 | 1/2015 | Lipowicz et al. |
| 2015/0047661 A1 | 2/2015 | Blackley et al. |
| 2015/0136158 A1 | 5/2015 | Stevens et al. |
| 2015/0150305 A1 | 6/2015 | Shenkal |
| 2015/0208731 A1 | 7/2015 | Malamud et al. |
| 2015/0224268 A1 | 8/2015 | Henry et al. |
| 2015/0272222 A1 | 10/2015 | Spinka et al. |
| 2015/0313287 A1* | 11/2015 | Verleur ................. A24F 40/42 131/329 |
| 2015/0327596 A1 | 11/2015 | Alarcon et al. |
| 2015/0333561 A1 | 11/2015 | Alarcon |
| 2015/0374040 A1 | 12/2015 | Chen |
| 2016/0021931 A1 | 1/2016 | Hawes et al. |
| 2016/0109115 A1 | 4/2016 | Lipowicz |
| 2016/0143361 A1 | 5/2016 | Juster et al. |
| 2016/0150824 A1 | 6/2016 | Memari et al. |
| 2016/0219933 A1 | 8/2016 | Henry et al. |
| 2016/0255876 A1 | 9/2016 | Rostami et al. |
| 2016/0261021 A1 | 9/2016 | Marion et al. |
| 2016/0271347 A1 | 9/2016 | Raichman |
| 2016/0286865 A1 | 10/2016 | King et al. |
| 2016/0302488 A1 | 10/2016 | Fernando et al. |
| 2016/0331027 A1 | 11/2016 | Cameron |
| 2016/0331035 A1 | 11/2016 | Cameron |
| 2016/0345632 A1 | 12/2016 | Lipowicz |
| 2016/0360787 A1 | 12/2016 | Bailey |
| 2016/0366725 A1 | 12/2016 | Tucker et al. |
| 2016/0374393 A1 | 12/2016 | Chen |
| 2016/0374397 A1 | 12/2016 | Jordan et al. |
| 2017/0006917 A1 | 1/2017 | Alvarez |
| 2017/0023952 A1 | 1/2017 | Henry et al. |
| 2017/0027227 A1 | 2/2017 | Lipowicz |
| 2017/0027232 A1 | 2/2017 | Scheck et al. |
| 2017/0042246 A1 | 2/2017 | Lau et al. |
| 2017/0079321 A1 | 3/2017 | Golz |
| 2017/0079322 A1 | 3/2017 | Li et al. |
| 2017/0108840 A1 | 4/2017 | Hawes et al. |
| 2017/0112194 A1 | 4/2017 | Sur et al. |
| 2017/0112196 A1 | 4/2017 | Sur et al. |
| 2017/0119052 A1 | 5/2017 | Williams et al. |
| 2017/0119053 A1 | 5/2017 | Henry et al. |
| 2017/0119054 A1 | 5/2017 | Zinovik et al. |
| 2017/0135412 A1 | 5/2017 | Cameron |
| 2017/0143043 A1 | 5/2017 | Liu |
| 2017/0150753 A1 | 6/2017 | Macko |
| 2017/0150755 A1 | 6/2017 | Batista |
| 2017/0150756 A1 | 6/2017 | Rexroad et al. |
| 2017/0181223 A1 | 6/2017 | Sur et al. |

(56) References Cited

U.S. PATENT DOCUMENTS

| | | |
|---|---|---|
| 2017/0188627 A1 | 7/2017 | Sur |
| 2017/0196269 A1 | 7/2017 | Bernauer et al. |
| 2017/0214261 A1 | 7/2017 | Gratton |
| 2017/0215477 A1 | 8/2017 | Reevell |
| 2017/0245551 A1 | 8/2017 | Reevell |
| 2017/0251721 A1 | 9/2017 | Rostami et al. |
| 2017/0251724 A1 | 9/2017 | Lamb et al. |
| 2017/0251725 A1 | 9/2017 | Buchberger et al. |
| 2017/0258134 A1 | 9/2017 | Bowen et al. |
| 2017/0258140 A1 | 9/2017 | Rostami et al. |
| 2017/0259170 A1 | 9/2017 | Bowen et al. |
| 2017/0280767 A1 | 10/2017 | Li et al. |
| 2017/0294804 A1 | 10/2017 | Sur |
| 2017/0303590 A1 | 10/2017 | Cameron et al. |
| 2017/0303593 A1 | 10/2017 | Cameron et al. |
| 2017/0303594 A1 | 10/2017 | Cameron et al. |
| 2017/0303597 A1 | 10/2017 | Tsui |
| 2017/0309091 A1 | 10/2017 | Cameron et al. |
| 2017/0325506 A1 | 11/2017 | Batista |
| 2017/0332702 A1 | 11/2017 | Cameron et al. |
| 2017/0360098 A1 | 12/2017 | Newcomb et al. |
| 2017/0367407 A1 | 12/2017 | Althorpe et al. |
| 2018/0027878 A1 | 2/2018 | Dendy et al. |
| 2018/0027879 A1 | 2/2018 | Gavrielov et al. |
| 2018/0068663 A1 | 3/2018 | Choi |
| 2018/0077967 A1 | 3/2018 | Hatton et al. |
| 2018/0116292 A1 | 5/2018 | Atkins et al. |
| 2018/0177231 A1 | 6/2018 | Woodbine et al. |
| 2018/0184722 A1 | 7/2018 | Murison et al. |
| 2018/0199627 A1 | 7/2018 | Bowen et al. |
| 2018/0242642 A1 | 8/2018 | Silvesstrini et al. |
| 2018/0280637 A1 | 10/2018 | Mayle et al. |
| 2019/0159519 A1 | 5/2019 | Bowen et al. |
| 2019/0200674 A1 | 7/2019 | Tucker et al. |
| 2019/0261689 A1 | 8/2019 | Bowen et al. |
| 2019/0373953 A1 | 12/2019 | Atkins et al. |
| 2019/0380388 A1 | 12/2019 | Amorde et al. |
| 2019/0387795 A1 | 12/2019 | Fisher et al. |
| 2020/0000143 A1 | 1/2020 | Anderson et al. |
| 2020/0000146 A1 | 1/2020 | Anderson et al. |
| 2020/0022417 A1 | 1/2020 | Atkins et al. |
| 2020/0029371 A1 | 1/2020 | Achtien et al. |
| 2020/0107585 A1 | 4/2020 | Atkins et al. |
| 2020/0112188 A1 | 4/2020 | Cheung et al. |
| 2020/0114094 A1 | 4/2020 | Atkins et al. |
| 2020/0120991 A1 | 4/2020 | Hatton et al. |
| 2020/0127475 A1 | 4/2020 | Cheung et al. |
| 2020/0128874 A1 | 4/2020 | Atkins et al. |

FOREIGN PATENT DOCUMENTS

| Country | Number | Date | Note |
|---|---|---|---|
| CN | 204070534 U | 1/2015 | |
| CN | 204275207 U | 4/2015 | |
| CN | 105848505 A | 8/2016 | |
| CN | 105963833 A | 9/2016 | |
| CN | 106028846 A | 10/2016 | |
| CN | 103501847 B | 11/2016 | |
| CN | 104102143 B | 4/2017 | |
| CN | 206462409 U | 9/2017 | |
| CN | 107708452 A | 2/2018 | |
| CN | 108649666 A * | 10/2018 | A62C 3/16 |
| EP | 3170414 A1 | 5/2017 | |
| EP | 3000245 B1 | 2/2018 | |
| GB | 2566857 B | 8/2019 | |
| JP | 2017135795 A | 8/2017 | |
| JP | 2017538410 A | 12/2017 | |
| JP | 2018138211 A | 9/2018 | |
| KR | 200470584 Y1 | 12/2013 | |
| KR | 101357574 B1 | 2/2014 | |
| KR | 101477930 B1 | 12/2014 | |
| RU | 2647805 C2 | 3/2018 | |
| TW | 201808373 A | 3/2018 | |
| WO | WO-2010118644 A1 | 10/2010 | |
| WO | WO-2012120487 A2 | 9/2012 | |
| WO | WO-2013113174 A1 | 8/2013 | |
| WO | WO-2015078147 A1 | 6/2015 | |
| WO | WO-2015107551 A2 | 7/2015 | |
| WO | WO-2015107552 A1 | 7/2015 | |
| WO | WO-2015128499 A1 | 9/2015 | |
| WO | WO-2015169127 A1 | 11/2015 | |
| WO | WO-2016019353 A1 | 2/2016 | |
| WO | WO-2016023809 A1 | 2/2016 | |
| WO | WO-2016079151 A1 | 5/2016 | |
| WO | WO-2016108694 A1 | 7/2016 | |
| WO | WO-2016118005 A1 | 7/2016 | |
| WO | WO-2016149932 A1 | 9/2016 | |
| WO | WO-2016172023 A1 | 10/2016 | |
| WO | WO-2016179376 A1 | 11/2016 | |
| WO | WO-2016197658 A1 | 12/2016 | |
| WO | WO-2016202028 A1 | 12/2016 | |
| WO | WO-2017033007 A1 | 3/2017 | |
| WO | WO-2017045897 A1 | 3/2017 | |
| WO | WO-2017056103 A1 | 4/2017 | |
| WO | WO-2017075827 A1 | 5/2017 | |
| WO | WO-2017076590 A1 | 5/2017 | |
| WO | WO-2017082728 A1 | 5/2017 | |
| WO | WO-2017085242 A1 | 5/2017 | |
| WO | WO-2017137510 A1 | 8/2017 | |
| WO | WO-2018017862 A1 | 1/2018 | |
| WO | WO-2018087738 A1 | 5/2018 | |
| WO | WO-2018122380 A1 | 7/2018 | |
| WO | WO-2018138688 A1 | 8/2018 | |
| WO | WO-2018178628 A1 | 10/2018 | |
| WO | WO-2019173923 A1 | 9/2019 | |
| WO | WO-2019232086 A1 | 12/2019 | |
| WO | WO-2020000869 A1 | 1/2020 | |
| WO | WO-2020023547 A1 | 1/2020 | |
| WO | WO-2020097570 A1 | 5/2020 | |

* cited by examiner

VAPORIZER DEVICE WITH CHARGING AND REVERSE-CHARGING CAPABILITY

TECHNICAL FIELD

This application is a continuation of PCT/US2019/067263, filed on Dec. 18, 2019, and entitled "Vaporizer Device", which claims priority to U.S. Provisional Patent Application No. 62/781,587, filed on Dec. 18, 2018, and entitled "Vaporizer Device", the disclosure of which is incorporated herein by reference in its entirety.

TECHNICAL FIELD

The subject matter described herein relates to vaporizer devices, including a disposable vaporizer cartridge.

BACKGROUND

Vaporizer devices, which can also be referred to as vaporizers, electronic vaporizer devices or e-vaporizer devices, can be used for delivery of an aerosol (or "vapor") containing one or more active ingredients by inhalation of the aerosol by a user of the vaporizing device. For example, electronic cigarettes, which may also be referred to as e-cigarettes, are a class of vaporizer devices that are typically battery powered and that may be used to simulate the experience of cigarette smoking, but without burning of tobacco or other substances.

In use of a vaporizer device, the user inhales an aerosol, commonly called vapor, which may be generated by a heating element that vaporizes (which generally refers to causing a liquid or solid to at least partially transition to the gas phase) a vaporizable material, which may be liquid, a solution, a solid, a wax, or any other form as may be compatible with use of a specific vaporizer device. The vaporizable material used with a vaporizer can be provided within a cartridge (e.g., a part of the vaporizer that contains the vaporizable material in a reservoir) that includes a mouthpiece (e.g., for inhalation by a user).

To receive the inhalable aerosol generated by a vaporizer device, a user may, in certain examples, activate the vaporizer device by taking a puff, by pressing a button, or by some other approach. A puff, as the term is generally used (and also used herein), refers to inhalation by the user in a manner that causes a volume of air to be drawn into the vaporizer device such that the inhalable aerosol is generated by a combination of vaporized vaporizable material with the air.

A typical approach by which a vaporizer device generates an inhalable aerosol from a vaporizable material involves heating the vaporizable material in a vaporization chamber (or a heater chamber) to cause the vaporizable material to be converted to the gas (or vapor) phase. A vaporization chamber generally refers to an area or volume in the vaporizer device within which a heat source (e.g., conductive, convective, and/or radiative) causes heating of a vaporizable material to produce a mixture of air and vaporized vaporizable to form a vapor for inhalation by a user of the vaporization device.

In some vaporizer device embodiments, the vaporizable material can be drawn out of a reservoir and into the vaporization chamber via a wicking element (a wick). Such drawing of the vaporizable material into the vaporization chamber can be due, at least in part, to capillary action provided by the wick, which pulls the vaporizable material along the wick in the direction of the vaporization chamber. However, as vaporizable material is drawn out of the reservoir, the pressure inside the reservoir is reduced, thereby creating a vacuum and acting against the capillary action. This can reduce the effectiveness of the wick to draw the vaporizable material into the vaporization chamber, thereby reducing the effectiveness of the vaporization device to vaporize a desired amount of vaporizable material, such as when a user takes a puff on the vaporizer device. Furthermore, the vacuum created in the reservoir can ultimately result in the inability to draw all of the vaporizable material into the vaporization chamber, thereby wasting vaporizable material. As such, improved vaporization devices and/or vaporization cartridges that improve upon or overcome these issues is desired.

The term vaporizer device, as used herein consistent with the current subject matter, generally refers to portable, self-contained, devices that are convenient for personal use. Typically, such devices are controlled by one or more switches, buttons, touch sensitive devices, or other user input functionality or the like (which can be referred to generally as controls) on the vaporizer, although a number of devices that may wirelessly communicate with an external controller (e.g., a smartphone, a smart watch, other wearable electronic devices, etc.) have recently become available. Control, in this context, refers generally to an ability to influence one or more of a variety of operating parameters, which may include without limitation any of causing the heater to be turned on and/or off, adjusting a minimum and/or maximum temperature to which the heater is heated during operation, various games or other interactive features that a user might access on a device, and/or other operations.

Various vaporizable materials having a variety of contents and proportions of such contents can be contained in the cartridge. Some vaporizable materials, for example, may have a smaller percentage of active ingredients per total volume of vaporizable material, such as due to regulations requiring certain active ingredient percentages. As such, a user may need to vaporize a large amount of vaporizable material (e.g., compared to the overall volume of vaporizable material that can be stored in a cartridge) to achieve a desired effect.

SUMMARY

In certain aspects of the current subject matter, challenges associated with charging an electronic vaporizer device in the absence of a charging device may be addressed by the inclusion of one or more of the features described herein or comparable/equivalent approaches as would be understood by one of ordinary skill in the art. Aspects of the current subject matter relate to apparatuses, methods, and system for the reverse charging of a vaporizer device.

In one aspect, there is provided a vaporizer. The vaporizer may include a vaporizer body configured to couple with a vaporizer cartridge including a vaporizable material. The vaporizer body may include a first power source configured to discharge a current to a heating element in order to cause a vaporization of at least a portion of the vaporizable material included in the vaporizer cartridge by at least increasing a temperature of the heating element. The vaporizer may be configured to engage in a reverse charging with a device in which the first power source of the vaporizer charges or is charged by a second power source at the device.

In some variations, one or more features disclosed herein including the following features can optionally be included in any feasible combination. The device may be another vaporizer or a mobile device.

In some variations, the vaporizer may be configured to engage in the reverse charging in response to a pairing being established between the vaporizer and the device. The pairing may be established based at least one of a first identifier of the vaporizer, a second identifier of the device, or a third identifier of a user associated with the vaporizer and/or the device. The pairing may be established by another device coupled with the vaporizer and/or the device.

In some variations, the vaporizer may be configured to engage in the reverse charging in response to the vaporizer being less than a threshold distance apart from the device.

In some variations, the vaporizer may be configured to engage in the reverse charging in response to the vaporizer being designated a donor or a recipient in the reverse charging. The vaporizer may be designated the donor in the reverse charging in response to the vaporizer being in a first orientation. The vaporizer may be designated the recipient in the reverse charging in response to the vaporizer being in the second orientation. The vaporizer body may further include one or more sensors for detecting when the vaporizer is in the first orientation or the second orientation.

In some variations, the vaporizer may be further configured to couple with another device. The vaporizer may be designated the donor or the recipient in the reverse charging in response to one or more inputs received at the other device.

In some variations, the vaporizer body may further include an output device configured to generate at least one of a visual output, an audio output, or a haptic output corresponding to a designation of the vaporizer as the donor or the recipient in the reverse charging.

In some variations, a threshold quantity of charge may be transferred between the vaporizer and the device engaged in the reverse charging. The threshold quantity of charge may be determined based at least on a first quantity of charge available or required at the vaporizer. The threshold quantity of charge may be determined based at least on a second quantity of charge available or required at the device.

In some variations, the vaporizer and the device may engage in the reverse charging via one or more electrical contacts coupling the vaporizer and the device.

In some variations, the vaporizer and the device may engage in the reverse charging via wireless inductive charging.

In some variations, the vaporizer and the device may engage in the reverse charging with another device. The reverse charging may include the other device receiving a charge from one of the vaporizer and the device. The reverse charging may further include the other device transferring a first portion of the charge to the other one of the vaporizer and the device. The reverse charging may further include the other device storing a second portion of the charge at the other device.

In some variations, the vaporizer body may further include a converter circuit configured to adjust an output voltage of the first power source at the vaporizer based at least on an input voltage of the second power source at the device.

In another aspect, there is provided a method for reverse charging. The method may include reverse charging a vaporizer comprising a vaporizer body configured to couple with a vaporizer cartridge including a vaporizable material. The vaporizer body may include a first power source configured to discharge a current to a heating element in order to cause a vaporization of at least a portion of the vaporizable material included in the vaporizer cartridge by at least increasing a temperature of the heating element. The reverse charging of the vaporizer may include the first power source of the vaporizer charging or being charged by a second power source at the device.

In some variations, one or more features disclosed herein including the following features can optionally be included in any feasible combination. The device may be another vaporizer or a mobile device.

In some variations, the method may further include engaging in the reverse charging in response to a pairing being established between the vaporizer and the device. The pairing may be established based at least one of a first identifier of the vaporizer, a second identifier of the device, or a third identifier of a user associated with the vaporizer and/or the device. The pairing may be established by another device coupled with the vaporizer and/or the device.

In some variations, the method may further include engaging in the reverse charging in response to the vaporizer being less than a threshold distance apart from the device.

In some variations, the method may further include engaging in the reverse charging in response to the vaporizer being designated a donor or a recipient in the reverse charging. The vaporizer may be designated the donor in the reverse charging in response to the vaporizer being in a first orientation. The vaporizer may be designated the recipient in the reverse charging in response to the vaporizer being in the second orientation. The vaporizer body may further include one or more sensors for detecting when the vaporizer is in the first orientation or the second orientation.

In some variations, the method may further include receiving, from another device coupled with the vaporizer, one or more inputs. The vaporizer may be designated as the donor or the recipient in the reverse charging in response to the one or more inputs received at the other device.

In some variations, the method may further include generating, by an output device at the vaporizer, at least one of a visual output, an audio output, or a haptic output corresponding to a designation of the vaporizer as the donor or the recipient in the reverse charging.

In some variations, the method may further include transferring a threshold quantity of charge between the vaporizer and the device engaged in the reverse charging. The threshold quantity of charge may be determined based at least on a first quantity of charge available or required at the vaporizer. The threshold quantity of charge may be determined based at least on a second quantity of charge available or required at the device.

In some variations, the vaporizer and the device may engage in the reverse charging via one or more electrical contacts coupling the vaporizer and the device.

In some variations, the vaporizer and the device may engage in the reverse charging via wireless inductive charging.

In some variations, the vaporizer and the device may engage in the reverse charging with another device. The reverse charging may include the other device receiving a charge from one of the vaporizer and the device. The reverse charging may further include the other device transferring a first portion of the charge to the other one of the vaporizer and the device. The reverse charging may further include the other device storing a second portion of the charge at the other device.

In some variations, the method may further include adjusting, by a converter circuit at the vaporizer, an output voltage of the first power source at the vaporizer based at least on an input voltage of the second power source at the device.

In another aspect, there is provided a system for reverse charging. The system may include a device and a vaporizer. The vaporizer may include a vaporizer comprising a vaporizer body configured to couple with a vaporizer cartridge including a vaporizable material. The vaporizer body may include a first power source configured to discharge a current to a heating element in order to cause a vaporization of at least a portion of the vaporizable material included in the vaporizer cartridge by at least increasing a temperature of the heating element. The vaporizer may be configured to engage in a reverse charging with the device in which the first power source of the vaporizer charging or being charged by a second power source at the device.

In some variations, one or more features disclosed herein including the following features can optionally be included in any feasible combination. The device may be another vaporizer or a mobile device.

In some variations, the method may further include engaging in the reverse charging in response to a pairing being established between the vaporizer and the device. The pairing may be established based at least one of a first identifier of the vaporizer, a second identifier of the device, or a third identifier of a user associated with the vaporizer and/or the device. The pairing may be established by another device coupled with the vaporizer and/or the device.

In some variations, the method may further include engaging in the reverse charging in response to the vaporizer being less than a threshold distance apart from the device.

In some variations, the method may further include engaging in the reverse charging in response to the vaporizer being designated a donor or a recipient in the reverse charging. The vaporizer may be designated the donor in the reverse charging in response to the vaporizer being in a first orientation. The vaporizer may be designated the recipient in the reverse charging in response to the vaporizer being in the second orientation. The vaporizer body may further include one or more sensors for detecting when the vaporizer is in the first orientation or the second orientation.

In some variations, the method may further include receiving, from another device coupled with the vaporizer, one or more inputs. The vaporizer may be designated as the donor or the recipient in the reverse charging in response to the one or more inputs received at the other device.

In some variations, the method may further include generating, by an output device at the vaporizer, at least one of a visual output, an audio output, or a haptic output corresponding to a designation of the vaporizer as the donor or the recipient in the reverse charging.

In some variations, the method may further include transferring a threshold quantity of charge between the vaporizer and the device engaged in the reverse charging. The threshold quantity of charge may be determined based at least on a first quantity of charge available or required at the vaporizer. The threshold quantity of charge may be determined based at least on a second quantity of charge available or required at the device.

In some variations, the vaporizer and the device may engage in the reverse charging via one or more electrical contacts coupling the vaporizer and the device.

In some variations, the vaporizer and the device may engage in the reverse charging via wireless inductive charging.

In some variations, the vaporizer and the device may engage in the reverse charging with another device. The reverse charging may include the other device receiving a charge from one of the vaporizer and the device. The reverse charging may further include the other device transferring a first portion of the charge to the other one of the vaporizer and the device. The reverse charging may further include the other device storing a second portion of the charge at the other device.

In some variations, the method may further include adjusting, by a converter circuit at the vaporizer, an output voltage of the first power source at the vaporizer based at least on an input voltage of the second power source at the device.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Implementations of the current subject matter include devices relating to vaporizing of one or more materials for inhalation by a user. The term "vaporizer" is used generically in the following description to refer to a vaporizer device. Examples of vaporizers consistent with implementations of the current subject matter include electronic vaporizers, electronic cigarettes, e-cigarettes, or the like. Such vaporizers are generally portable, hand-held devices that heat a vaporizable material to provide an inhalable dose of the material.

The vaporizable material used with a vaporizer may optionally be provided within a cartridge (e.g., a part of the vaporizer that contains the vaporizable material in a reservoir or other container and that can be refillable when empty or disposable in favor of a new cartridge containing additional vaporizable material of a same or different type). A vaporizer may be a cartridge-using vaporizer, a cartridge-less vaporizer, or a multi-use vaporizer capable of use with or without a cartridge. For example, a multi-use vaporizer may include a heating chamber (e.g., an oven) configured to receive a vaporizable material directly in the heating chamber and also to receive a cartridge or other replaceable device having a reservoir, a volume, or the like for at least partially containing a usable amount of vaporizable material.

In various implementations of the current subject matter a vaporizer may be configured for use with vaporizable material (e.g., a carrier solution in which an active and/or inactive ingredient(s) are suspended or held in solution or a neat liquid form of the vaporizable material itself) or a solid vaporizable material. A solid vaporizable material may include a plant material that emits some part of the plant material as the vaporizable material (e.g., such that some part of the plant material remains as waste after the vaporizable material is emitted for inhalation by a user) or optionally can be a solid form of the vaporizable material itself (e.g., a "wax") such that all of the solid material can eventually be vaporized for inhalation. A vaporizable material can likewise be capable of being completely vaporized or can include some part of the liquid material that remains after all of the material suitable for inhalation has been consumed.

Figure 1A:
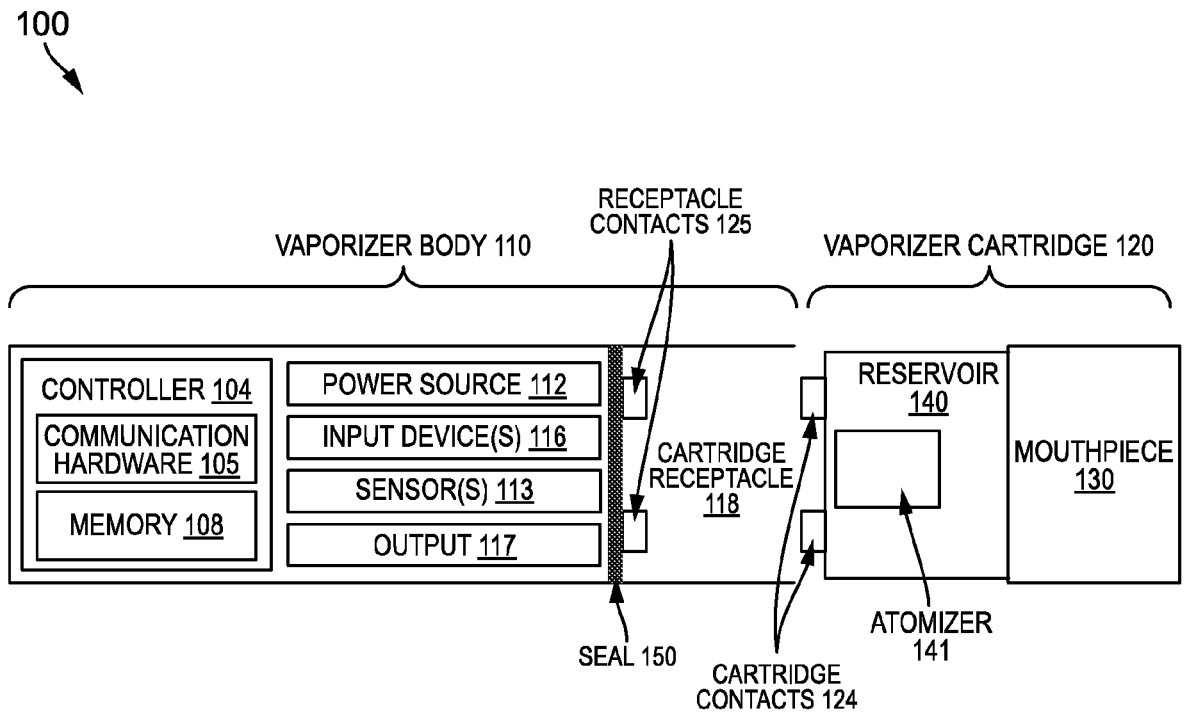
FIG. 1A depicts a block diagram illustrating an example of a vaporizer consistent with implementations of the current subject matter.
Figure 1B:
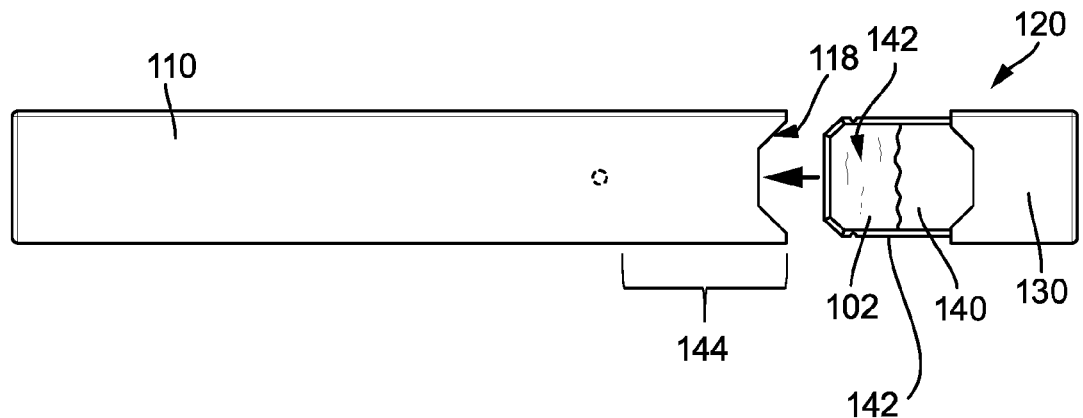
FIG. 1B depict a top view of an example of a vaporizer consistent with implementations of the current subject matter.

Referring to the block diagram of FIG. 1A and a side perspective view of FIG. 1B, a vaporizer 100 typically includes a power source 112 (such as a battery which may be a rechargeable battery), and a controller 104 (e.g., a processor, circuitry, etc. capable of executing logic) for controlling delivery of heat to an atomizer 141 to cause a vaporizable material to be converted from a condensed form (e.g., a solid, a liquid, a solution, a suspension, a part of an at least partially unprocessed plant material, etc.) to the gas phase. The controller 104 may be part of one or more printed circuit boards (PCBs) consistent with certain implementations of the current subject matter.

After conversion of the vaporizable material to the gas phase, and depending on the type of vaporizer, the physical and chemical properties of the vaporizable material, and/or other factors, at least some of the gas-phase vaporizable material may condense to form particulate matter in at least a partial local equilibrium with the gas phase as part of an aerosol, which can form some or all of an inhalable dose provided by the vaporizer 100 for a given puff or draw on the vaporizer. It will be understood that the interplay between gas and condensed phases in an aerosol generated by a vaporizer can be complex and dynamic, as factors such as ambient temperature, relative humidity, chemistry, flow conditions in airflow paths (both inside the vaporizer and in the airways of a human or other animal), mixing of the gas-phase or aerosol-phase vaporizable material with other air streams, etc. may affect one or more physical parameters of an aerosol. In some vaporizers, and particularly for vaporizers for delivery of more volatile vaporizable materials, the inhalable dose may exist predominantly in the gas phase (i.e., formation of condensed phase particles may be very limited).

Vaporizers for use with vaporizable materials (e.g., neat liquids, suspensions, solutions, mixtures, etc.) typically include the atomizer 141 in which a wicking element (also referred to herein as a wick (not shown in FIG. 1A or 1B), which can include any material capable of causing fluid motion by capillary pressure) conveys an amount of a vaporizable material to a part of the atomizer 141 that includes a heating element (also not shown in FIG. 1A or 1B). The wicking element is generally configured to draw vaporizable material from a reservoir configured to contain (and that may in use contain) the vaporizable material such that the vaporizable material may be vaporized by heat delivered from a heating element. The wicking element may also optionally allow air to enter the reservoir to replace the volume of liquid removed. In other words, capillary action pulls vaporizable material into the wick for vaporization by the heating element (described below), and air may, in some implementations of the current subject matter, return to the reservoir through the wick to at least partially equalize pressure in the reservoir. Other approaches to allowing air back into the reservoir to equalize pressure are also within the scope of the current subject matter.

The heating element can be or include one or more of a conductive heater, a radiative heater, and a convective heater. One type of heating element is a resistive heating element, which can be constructed of or at least include a material (e.g., a metal or alloy, for example a nickel-chromium alloy, or a non-metallic resistor) configured to dissipate electrical power in the form of heat when electrical current is passed through one or more resistive segments of the heating element. In some implementations of the current subject matter, an atomizer can include a heating element that includes resistive coil or other heating element wrapped around, positioned within, integrated into a bulk shape of, pressed into thermal contact with, or otherwise arranged to deliver heat to a wicking element to cause a vaporizable material drawn by the wicking element from a reservoir to be vaporized for subsequent inhalation by a user in a gas and/or a condensed (e.g., aerosol particles or droplets) phase. Other wicking element, heating element, and/or atomizer assembly configurations are also possible, as discussed further below.

Certain vaporizers may also or alternatively be configured to create an inhalable dose of gas-phase and/or aerosol-phase vaporizable material via heating of a non-vaporizable material, such as for example a solid-phase vaporizable material (e.g., a wax or the like) or plant material (e.g., tobacco leaves and/or parts of tobacco leaves) containing the vaporizable material. In such vaporizers, a resistive heating element may be part of or otherwise incorporated into or in thermal contact with the walls of an oven or other heating chamber into which the non-vaporizable material is placed. Alternatively, a resistive heating element or elements may be used to heat air passing through or past the non-vaporizable material to cause convective heating of the non-vaporizable material. In still other examples, a resistive heating element or elements may be disposed in intimate contact with plant material such that direct conductive heating of the plant material occurs from within a mass of the plant material (e.g., as opposed to only by conduction inward form walls of an oven).

The heating element may be activated (e.g., a controller, which is optionally part of a vaporizer body as discussed below, may cause current to pass from the power source through a circuit including the resistive heating element, which is optionally part of a vaporizer cartridge as discussed below), in association with a user puffing (e.g., drawing, inhaling, etc.) on a mouthpiece 130 of the vaporizer to cause air to flow from an air inlet, along an airflow path that passes an atomizer (e.g., wicking element and heating element), optionally through one or more condensation areas or chambers, to an air outlet in the mouthpiece. Incoming air passing along the airflow path passes over, through, etc. the atomizer, where gas phase vaporizable material is entrained into the air. As noted above, the entrained gas-phase vaporizable material may condense as it passes through the remainder of the airflow path such that an inhalable dose of the vaporizable material in an aerosol form can be delivered from the air outlet (e.g., in a mouthpiece 130 for inhalation by a user).

Activation of the heating element may be caused by automatic detection of the puff based on one or more of signals generated by one or more sensors 113, such as for example a pressure sensor or sensors disposed to detect pressure along the airflow path relative to ambient pressure (or optionally to measure changes in absolute pressure), one or more motion sensors of the vaporizer, one or more flow sensors of the vaporizer, a capacitive lip sensor of the vaporizer; in response to detection of interaction of a user with one or more input devices 116 (e.g., buttons or other tactile control devices of the vaporizer 100), receipt of signals from a computing device in communication with the vaporizer; and/or via other approaches for determining that a puff is occurring or imminent.

As alluded to in the previous paragraph, a vaporizer consistent with implementations of the current subject matter may be configured to connect (e.g., wirelessly or via a wired connection) to a computing device (or optionally two or more devices) in communication with the vaporizer. To this end, the controller 104 may include communication hardware 105. The controller 104 may also include a memory 108. A computing device can be a component of a vaporizer system that also includes the vaporizer 100, and can include its own communication hardware, which can establish a wireless communication channel with the communication hardware 105 of the vaporizer 100. For example, a computing device used as part of a vaporizer system may include a general purpose computing device (e.g., a smartphone, a tablet, a personal computer, some other portable device such as a smartwatch, or the like) that executes software to produce a user interface for enabling a user of the device to interact with a vaporizer. In other implementations of the current subject matter, such a device used as part of a vaporizer system can be a dedicated piece of hardware such as a remote control or other wireless or wired device having one or more physical or soft (e.g., configurable on a screen or other display device and selectable via user interaction with a touch-sensitive screen or some other input device like a mouse, pointer, trackball, cursor buttons, or the like) interface controls. The vaporizer 100 can also include one or more output 117 features and/or devices for providing information to the user. For example, the one or more output 117 features and/or devices may provide a visual output (e.g., various color light emitting diodes (LEDs)), an audio output, a haptic output (e.g., vibrations), and/or the like.

In some implementations of the current subject matter, the one or more output 117 features and/or devices may include light emitting diodes (LEDs) and/or haptics. For example, the vaporizer 100 may provide haptic feedback in addition to or instead of visual feedback (e.g., various color light emitting diodes (LED). The haptics may be included in conjunction with or instead of the light emitting diodes.

In instances where the one or more output 117 features and/or devices include haptics, haptic feedback may be used to convey a variety of information. For example, the vaporizer 100 may provide the haptic feedback in response to signals received from one or more components of the vaporizer 100 and/or a device coupled with the vaporizer 100 including, for example, pressure sensors, voltage sensors, motion sensors, accelerometers, geographic positioning device, capacitive lip sensor, and/or the like. Accordingly, the vaporizer 100 may provide one or more haptic feedback in response to the vaporizer 100 being placed in a user's mouth and/or in a user's hand. The vaporizer 100 may also provide one or more haptic feedback in response to detecting a puff and/or a threshold quantity of puffs (e.g., over a set period of time). Alternatively and/or additionally, the vaporizer 100 may provide one or more haptic feedback in response to the insertion of a cartridge (e.g., the cartridge 120) and/or corresponding to one or more characteristics of the cartridge inserted into the vaporizer 100 (e.g., flavor, volume of the vaporizable material remaining in the cartridge, and/or the like). One or more haptic feedback may be used to communicate a battery level, sessioning data, status of the vaporizer 100 (e.g., locked, unlocked, and/or the like), pairing status with other devices (e.g., Bluetooth pairing), and/or the like. The one or more output 117 features and/or devices may be configured to provide any form of haptic feedback that interfaces with a user of the vaporizer 100 by applying one or more forces, vibrations, motions, and/or the like.

A computing device that is part of a vaporizer system as defined above can be used for any of one or more functions, such as controlling dosing (e.g., dose monitoring, dose setting, dose limiting, user tracking, etc.), controlling sessioning (e.g., session monitoring, session setting, session limiting, user tracking, etc.), controlling nicotine delivery (e.g., switching between nicotine and non-nicotine vaporizable material, adjusting an amount of nicotine delivered, etc.), obtaining locational information (e.g., location of other users, retailer/commercial venue locations, vaping locations, relative or absolute location of the vaporizer itself, etc.), vaporizer personalization (e.g., naming the vaporizer, locking/password protecting the vaporizer, adjusting one or more parental controls, associating the vaporizer with a user group, registering the vaporizer with a manufacturer or warranty maintenance organization, etc.), engaging in social activities (e.g., games, social media communications, interacting with one or more groups, etc.) with other users, or the like. The terms "sessioning", "session", "vaporizer session," or "vapor session," are used generically to refer to a period devoted to the use of the vaporizer. The period can include a time period, a number of doses, an amount of vaporizable material, and/or the like.

In the example in which a computing device provides signals related to activation of the resistive heating element, or in other examples of coupling of a computing device with a vaporizer for implementation of various control or other functions, the computing device executes one or more computer instructions sets to provide a user interface and underlying data handling. In one example, detection by the computing device of user interaction with one or more user interface elements can cause the computing device to signal the vaporizer 100 to activate the heating element, either to a full operating temperature for creation of an inhalable dose of vapor/aerosol. Other functions of the vaporizer may be controlled by interaction of a user with a user interface on a computing device in communication with the vaporizer.

The temperature of a resistive heating element of a vaporizer may depend on a number of factors, including an amount of electrical power delivered to the resistive heating element and/or a duty cycle at which the electrical power is delivered, conductive heat transfer to other parts of the electronic vaporizer and/or to the environment, latent heat losses due to vaporization of a vaporizable material from the wicking element and/or the atomizer as a whole, and convective heat losses due to airflow (e.g., air moving across the heating element or the atomizer as a whole when a user inhales on the electronic vaporizer). As noted above, to reliably activate the heating element or heat the heating element to a desired temperature, a vaporizer may, in some implementations of the current subject matter, make use of signals from a pressure sensor to determine when a user is inhaling. The pressure sensor can be positioned in the airflow path and/or can be connected (e.g., by a passageway or other path) to an airflow path connecting an inlet for air to enter the device and an outlet via which the user inhales the resulting vapor and/or aerosol such that the pressure sensor experiences pressure changes concurrently with air passing through the vaporizer device from the air inlet to the air outlet. In some implementations of the current subject matter, the heating element may be activated in association with a user's puff, for example by automatic detection of the puff, for example by the pressure sensor detecting a pressure change in the airflow path.

Typically, the pressure sensor (as well as any other sensors 113) can be positioned on or coupled (e.g., electrically or electronically connected, either physically or via a wireless connection) to the controller 104 (e.g., a printed circuit board assembly or other type of circuit board). To take measurements accurately and maintain durability of the vaporizer, it can be beneficial to provide a resilient seal 150 to separate an airflow path from other parts of the vaporizer. The seal 150, which can be a gasket, may be configured to at least partially surround the pressure sensor such that connections of the pressure sensor to internal circuitry of the vaporizer are separated from a part of the pressure sensor exposed to the airflow path. In an example of a cartridge-based vaporizer, the seal 150) may also separate parts of one or more electrical connections between a vaporizer body 110 and a vaporizer cartridge 120. Such arrangements of a seal 150 in a vaporizer 100 can be helpful in mitigating against potentially disruptive impacts on vaporizer components resulting from interactions with environmental factors such as water in the vapor or liquid phases, other fluids such as the vaporizable material, etc. and/or to reduce escape of air from the designed airflow path in the vaporizer. Unwanted air, liquid or other fluid passing and/or contacting circuitry of the vaporizer can cause various unwanted effects, such as alter pressure readings, and/or can result in the buildup of unwanted material, such as moisture, the vaporizable material, etc. in parts of the vaporizer where they may result in poor pressure signal, degradation of the pressure sensor or other components, and/or a shorter life of the vaporizer. Leaks in the seal 150 can also result in a user inhaling air that has passed over parts of the vaporizer device containing or constructed of materials that may not be desirable to be inhaled.

A general class of vaporizers that have recently gained popularity includes a vaporizer body 110 that includes a controller 104, a power source 112 (e.g., battery), one more sensors 113, charging contacts, a seal 150, and a cartridge receptacle 118 configured to receive a vaporizer cartridge 120 for coupling with the vaporizer body through one or more of a variety of attachment structures. The cartridge receptable 118 can be positioned at a proximate end 144 of the vaporizer body 110 (see FIG. 1B). In some examples, vaporizer cartridge 120 includes a reservoir 140 for containing a vaporizable material and a mouthpiece 130 for delivering an inhalable dose to a user. The vaporizer cartridge can include an atomizer 141 having a wicking element and a heating element, or alternatively, one or both of the wicking element and the heating element can be part of the vaporizer body. In implementations in which any part of the atomizer 141 (e.g., heating element and/or wicking element) is part of the vaporizer body, the vaporizer can be configured to supply liquid vaporizer material from a reservoir in the vaporizer cartridge to the atomizer part(s) included in the vaporizer body.

Cartridge-based configurations for vaporizers that generate an inhalable dose of a non-vaporizable material via heating of a non-vaporizable material are also within the scope of the current subject matter. For example, a vaporizer cartridge may include a mass of a plant material that is processed and formed to have direct contact with parts of one or more resistive heating elements, and such a vaporizer cartridge may be configured to be coupled mechanically and electrically to a vaporizer body the includes a processor, a power source, and electrical contacts for connecting to corresponding cartridge contacts for completing a circuit with the one or more resistive heating elements.

In vaporizers in which the power source 112 is part of a vaporizer body 110 and a heating element is disposed in a vaporizer cartridge 120 configured to couple with the vaporizer body 110, the vaporizer 100 may include electrical connection features (e.g., means for completing a circuit) for completing a circuit that includes the controller 104 (e.g., a printed circuit board, a microcontroller, or the like), the power source 112, and the heating element. These features may include at least two contacts on a bottom surface of the vaporizer cartridge 120 (referred to herein as cartridge contacts 124) and at least two contacts disposed near a base of the cartridge receptacle (referred to herein as receptacle contacts 125) of the vaporizer 100 such that the cartridge contacts 124 and the receptacle contacts 125 make electrical connections when the vaporizer cartridge 120 is inserted into and coupled with the cartridge receptacle 118. The circuit completed by these electrical connections can allow delivery of electrical current to the resistive heating element and may further be used for additional functions, such as for example for measuring a resistance of the resistive heating element for use in determining and/or controlling a temperature of the resistive heating element based on a thermal coefficient of resistivity of the resistive heating element, for identifying a cartridge based on one or more electrical characteristics of a resistive heating element or the other circuitry of the vaporizer cartridge, etc.

In some examples of the current subject matter, the at least two cartridge contacts and the at least two receptacle contacts can be configured to electrically connect in either of at least two orientations. In other words, one or more circuits necessary for operation of the vaporizer can be completed by insertion of a vaporizer cartridge 120 in the cartridge receptacle 118 in a first rotational orientation (around an axis along which the end of the vaporizer cartridge having the cartridge is inserted into the cartridge receptacle 118 of the vaporizer body 110) such that a first cartridge contact of the at least two cartridge contacts 124 is electrically connected to a first receptacle contact of the at least two receptacle contacts 125 and a second cartridge contact of the at least two cartridge contacts 124 is electrically connected to a second receptacle contact of the at least two receptacle contacts 125. Furthermore, the one or more circuits necessary for operation of the vaporizer can be completed by insertion of a vaporizer cartridge 120 in the cartridge receptacle 118 in a second rotational orientation such that the first cartridge contact of the at least two cartridge contacts 124 is electrically connected to the second receptacle contact of the at least two receptacle contacts 125 and the second cartridge contact of the at least two cartridge contacts 124 is electrically connected to the first receptacle contact of the at least two receptacle contacts 125. This feature of a vaporizer cartridge 120 being reversible insertable into a cartridge receptacle 118 of the vaporizer body 110 is described further below.

In one example of an attachment structure for coupling a vaporizer cartridge 120 to a vaporizer body, the vaporizer body 110 includes a detent (e.g., a dimple, protrusion, etc.) protruding inwardly from an inner surface the cartridge receptacle 118. One or more exterior surfaces of the vaporizer cartridge 120 can include corresponding recesses (not shown in FIG. 1) that can fit and/or otherwise snap over such detents when an end of the vaporizer cartridge 120 inserted into the cartridge receptacle 118 on the vaporizer body 110. When the vaporizer cartridge 120 and the vaporizer body 110 are coupled (e.g., by insertion of an end of the vaporizer cartridge 120 into the cartridge receptacle 118 of the vaporizer body 110), the detent into the vaporizer body 110 may fit within and/or otherwise be held within the recesses of the vaporizer cartridge 120 to hold the vaporizer cartridge 120 in place when assembled. Such a detent-recess assembly can provide enough support to hold the vaporizer cartridge 120 in place to ensure good contact between the at least two cartridge contacts 124 and the at least two receptacle contacts 125, while allowing release of the vaporizer cartridge 120 from the vaporizer body 110 when a user pulls with reasonable force on the vaporizer cartridge 120 to disengage the vaporizer cartridge 120 from the cartridge receptacle 118.

Further to the discussion above about the electrical connections between a vaporizer cartridge and a vaporizer body being reversible such that at least two rotational orientations of the vaporizer cartridge in the cartridge receptacle are possible, in some vaporizers the shape of the vaporizer cartridge, or at least a shape of the end of the vaporizer cartridge that is configured for insertion into the cartridge receptacle may have rotational symmetry of at least order two. In other words, the vaporizer cartridge or at least the insertable end of the vaporizer cartridge may be symmetric upon a rotation of 180° around an axis along which the vaporizer cartridge is inserted into the cartridge receptacle. In such a configuration, the circuitry of the vaporizer may support identical operation regardless of which symmetrical orientation of the vaporizer cartridge occurs.

In some examples, the vaporizer cartridge, or at least an end of the vaporizer cartridge configured for insertion in the cartridge receptacle may have a non-circular cross section transverse to the axis along which the vaporizer cartridge is inserted into the cartridge receptacle. For example, the non-circular cross section may be approximately rectangular, approximately elliptical (e.g., have an approximately oval shape), non-rectangular but with two sets of parallel or approximately parallel opposing sides (e.g., having a parallelogram-like shape), or other shapes having rotational symmetry of at least order two. In this context, approximately having a shape, indicates that a basic likeness to the described shape is apparent, but that sides of the shape in question need not be completely linear and vertices need not be completely sharp. Rounding of both or either of edges or vertices of the cross-sectional shape is contemplated in the description of any non-circular cross section referred to herein.

The at least two cartridge contacts and the at least two receptacle contacts can take various forms. For example, one or both sets of contacts may include conductive pins, tabs, posts, receiving holes for pins or posts, or the like. Some types of contacts may include springs or other urging features to cause better physical and electrical contact between the contacts on the vaporizer cartridge and the vaporizer body. The electrical contacts may optionally be gold-plated, and/or can include other materials.

As shown in FIG. 1B, the vaporizer cartridge 120 can include a reservoir 140) for containing a vaporizable material 102. The reservoir 140 can include a level window 142 that shows a level or volume of the vaporizable material 102, depending on the orientation of the vaporizer 100 and/or vaporizer cartridge 120. The level window 142 can be formed of at least a portion of one side of the reservoir 140, or can be formed by at least a portion of the reservoir 140 extending from the mouthpiece 130, and as such can circumnavigate the reservoir 140 such that the level or volume of the vaporizable material 102 can be viewed from virtually any angle or orientation.

In some implementations of the current subject matter, an inner and/or outer surface of the reservoir 140) that forms the level window 142 can include graphical lines, etchings, protrusions, detents, or the like, to visually indicate a measured amount or volume of the vaporizable material 102. An inner wall of the reservoir 140 that forms the level window 142 can be textured, which enhances a visual differentiation between a liquid-bearing wall or surface and a wall or surface that is not in contact with such liquid. An illumination layer, formed of a dense liquid such as a lipid, or other natural or synthetic oils, waxes, gels, can be provided to the vaporizable material 102. The illumination layer is denser than the vaporizable material 102, and will create a meniscus or floating top layer. When illuminated by an illumination source to the inner space of the reservoir 140, the illumination layer can provide an illuminated level indication. The illumination source can be provided within the reservoir 140, or can be provided external to the reservoir 140 to illuminate the interior of the reservoir 140.

Figure 2A:
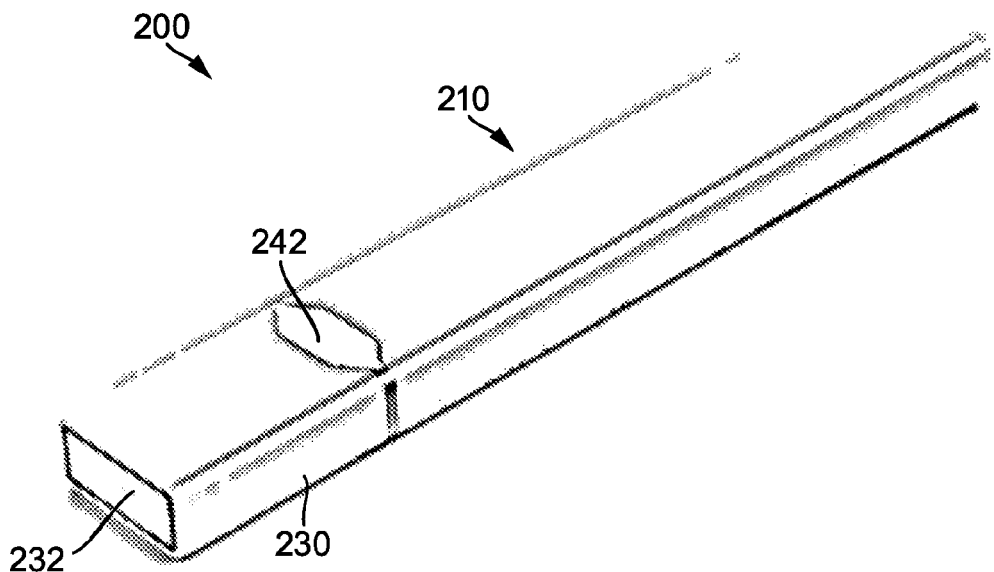
FIG. 2A depicts a perspective view of an example of a vaporizer consistent with implementations of the current subject matter.
Figure 2B:
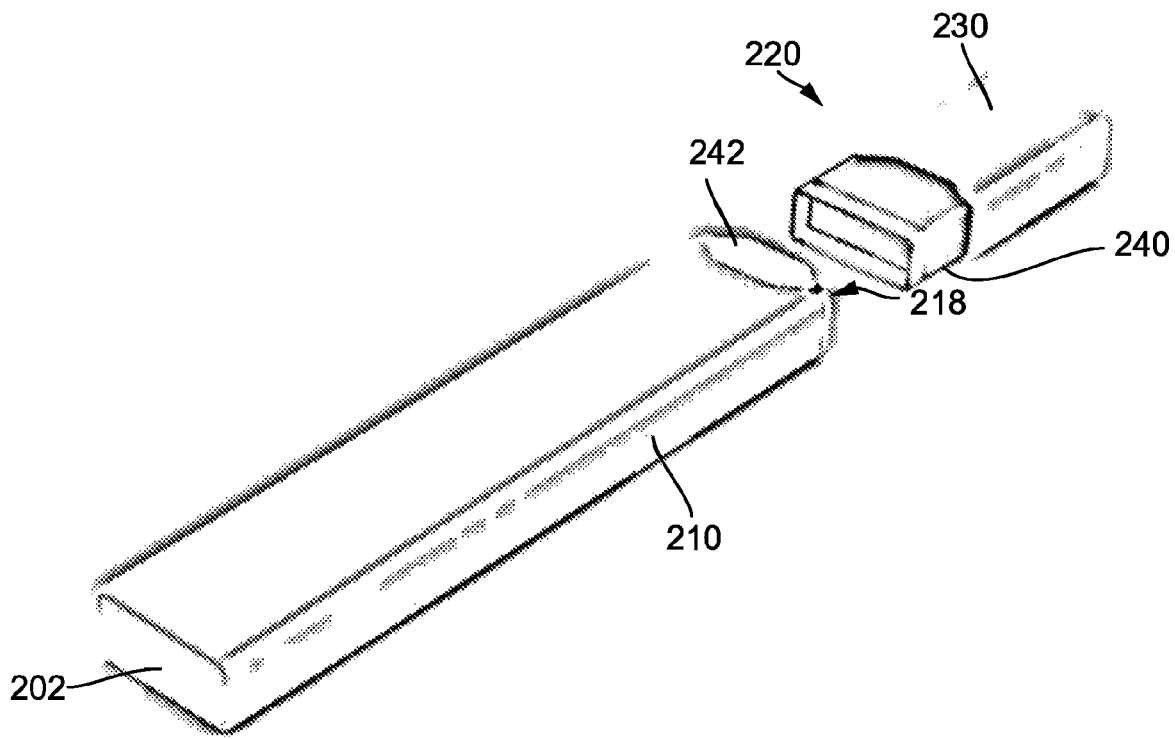
FIG. 2B depicts another perspective view of a vaporizer consistent with implementations of the current subject matter.

FIGS. 2A-B depict perspective views of an example of a vaporizer 200 consistent with implementations of the current subject matter. As shown in FIGS. 2A-B, the vaporizer 200 can include the vaporizer body 210, which is configured to receive and connect with the vaporizer cartridge 220. The vaporizer body 210 can include a cartridge receptacle 218 defined by one or more sidewalls and an opening that forms a receiving space for at least part of the vaporizer cartridge 220. The vaporizer cartridge 220 can include a male portion defined at least in part by the reservoir 240 that can be inserted into the cartridge receptacle 218. The vaporizer body 210 and/or the vaporizer cartridge 220 can include a mating mechanism, such as a latch, friction fit, gasket, one or more interlocking ridges, or the like, to secure at least part of the vaporizer cartridge 220 within the cartridge receptacle 218 of the vaporizer body 210.

The vaporizer body 210 can include one or more side walls, defining any numbers of shapes, the cross section of which can be circular, rectangular, oval, squared, or any other polygonal cross-sectional shape. The one or more side walls of the vaporizer body 210 can be formed of a rigid material, such as metal, ceramic, plastic, nylon or other rigid or semi-rigid material. A base 202 of the vaporizer body 210, opposite the cartridge receptacle 218, can include a charge port. The charge port can include one or more electrical contacts for being mated with corresponding electrical contents of a charging platform, or the charge port can include a flat surface with an induction charger for being mated with a corresponding induction charging platform.

In some implementations of the current subject matter, the vaporizer body 210 can include, and/or can contain, communication hardware, such as the communication hardware 105 described above, and at least one of the one or more side walls of the vaporizer body 210, or sections thereof, can be made of ceramic or other non-metallic crystalline or semi-crystalline organic material, such as glass, etc., to facilitate communication by the communication hardware included or contained therein.

For instance, the communication hardware can include a Bluetooth R; transceiver, and which can be mounted within the vaporizer body 210 at any position where at least one of the one or more side walls of the vaporizer body 210 are non-metallic, such as ceramic, plastic, etc. In some instances, the vaporizer body 210 can include a band 242 proximate the cartridge receptacle 218. The band 242 can surround or enclose around a distal end of the vaporizer body 210 proximate the cartridge receptacle 218. In other implementations of the current subject matter, the band 242 can be attached to, and surround or enclose, at least a portion of the vaporizer cartridge 220, i.e. around the reservoir 240 and between the reservoir 240) and the mouthpiece 230 having an air passageway 232. If made of a non-metallic material, the vaporizer 100 can include communication hardware that is mounted proximate the band 242, whether the band 242 is connected with the vaporizer body 210 or the vaporizer cartridge 220).

In some implementations of the current subject matter, the band 242 can be made of metal, such as a polished metal, and can include one or more signal elements such as light emitting diodes (LEDs) or the like for user interface and interaction, such as displaying light to indicate a status and/or operation of the vaporizer 200. In other implementations of the current subject matter, the one or more signal elements can be positioned anywhere along the vaporizer body 210, such as integrated with the one or more side walls of the vaporizer body 210. Further, the one or more signal elements can be positioned anywhere along or within the vaporizer cartridge 220, and can be powered by the power source 112 of the vaporizer when the vaporizer cartridge 220 is connected with the vaporizer body 210.

Figure 3:
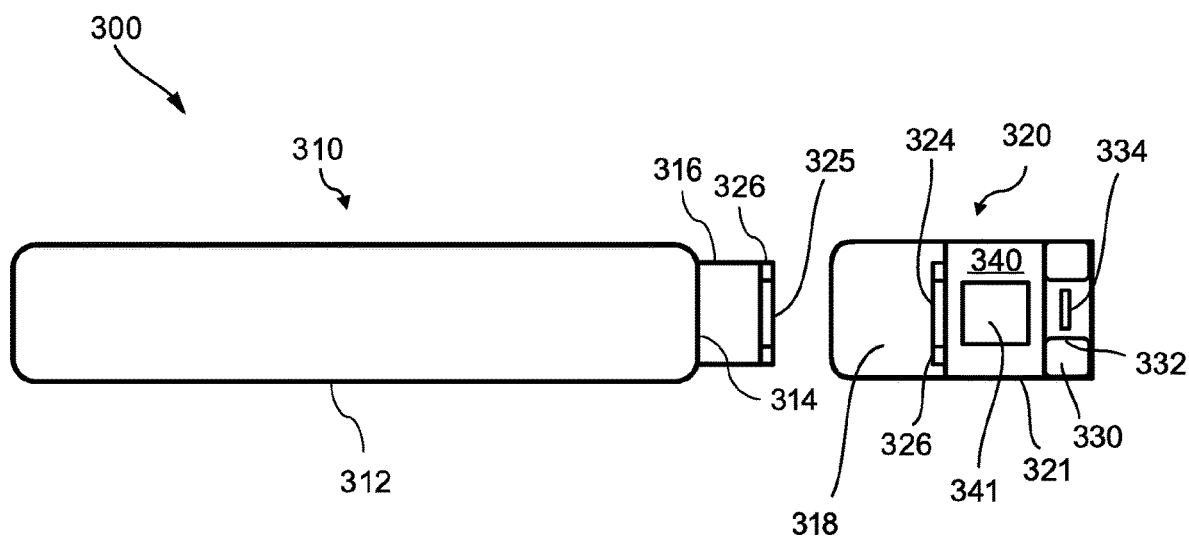
FIG. 3 depicts a block diagram illustrating another example of a vaporizer consistent with alternative implementations of the current subject matter.

FIG. 3 depicts a block diagram illustrating another example of a vaporizer 300 consistent with alternative implementations of the current subject matter. Referring to FIG. 3, the vaporizer 300 can include the vaporizer body 310, which can be configured to receive and/or mate with the vaporizer cartridge 320. The vaporizer body 310 can include, without limitation, one or more of the components and features shown in and/or described above with reference to FIGS. 1A-B and 2A-B. However, instead of having a cartridge receptacle, the vaporizer body 310 of the example of the vaporizer 300 shown in FIG. 3 may include a housing 312 that defines a proximal face 314 from which a male portion 316 protrudes or extends. The male portion 316 can include one or more body electrical contacts 325, preferably on a forward face of the male portion 316 but which can be located anywhere on the male portion 316. The example of the vaporizer cartridge 320 shown in FIG. 3 can include a body receptacle 318 for receiving the male portion 316 and for mating or connecting with the vaporizer body 310 via one or more mating and/or connecting mechanisms, including those described herein, for example.

The one or more body electrical contacts 325 are sized, positioned and configured to connect with one or more corresponding cartridge electrical contacts 324 positioned within the body receptacle 318 of the vaporizer cartridge 320, for providing electrical power to the atomizer 341 for vaporizing a vaporizable material contained with the reservoir 340 of the vaporizer cartridge 320. The vaporizer cartridge 320 can also include other electrical components, such as a communication module or transceiver, one or sensors such as a pressure sensor, voltage sensor, motion sensor, or accelerometer, a geographic positioning device, or the like, any of which can be powered from within the vaporizer cartridge 320 or from a power source of the vaporizer body 310 via the electrical contacts 326, 325. The vaporizer cartridge 320 can further include the mouthpiece 330 having an air passageway 332 through which a vaporized vaporizable material can be inhaled by a user.

The male portion 316 of the vaporizer body 310 and/or the body receptacle 318 of the vaporizer cartridge 320, and/or the reservoir 340 can include one or more illumination sources, such as LEDs, to provide operational indicators such as, for example, a battery level, a quantity of the vaporizable material in the reservoir 340, a use status of the vaporizer 300, and/or an identity of the vaporizable material in the reservoir 340, such as a flavor, a chemical content, a quality, or the like, and as explained in further detail below.

As shown in FIG. 3, the vaporizer cartridge 320 can include a housing 321. The housing 321 can be formed of any rigid or semi-rigid material, such as plastic, ceramic, metal or the like. The housing 321 can be opaque or translucent. The housing 321 proximate the reservoir 340, or a part of the housing 321 forming the reservoir 340, can be translucent so as to provide a visual indicator of a quantity of the vaporizable material remaining vaporizable material in the reservoir 340, and/or to allow light from a light source to pass through. The housing 321 can include one or more light guides, such as reflective micro-channels for instance, that can provide an illuminated graphic or graphical indicator, such as logo, a level indicator, or an operational indicator. In some implementations of the current subject matter, the housing 321 can include a polymer dispersed liquid crystal that can change opacity when a user uses the device, when the vaporizer cartridge 320 is connected with the vaporizer body 310, or based on a sensing by one of the one or more sensors.

In some implementations of the current subject matter, the mouthpiece 330 of the vaporizer cartridge 320 can include a flavor indicator 334, such as one or more light emitting diodes (LEDs) or light guides, or the like. The flavor indicator 334 can provide a unique color for each flavor of the vaporizable material provided in the reservoir 340. For instance, the flavor indicator 334 can include one or more of a red LED, a green LED, and a blue LED, or other combination of colors, to provide the unique color indicator. When the vaporizer cartridge 320 is coupled with the vaporizer body 310, logic in the vaporizer cartridge 320 and/or the vaporizer body 310 can read the cartridge information that has been encoded into or with the vaporizer cartridge 320 and control the operation of the flavor indicator 334 based on at least a portion of the cartridge information. As discussed above, the flavor indicator 334 can also be located anywhere along the vaporizer cartridge 320 and/or the vaporizer body 310, but preferably in or proximate to the mouthpiece 330.

Figure 4A:
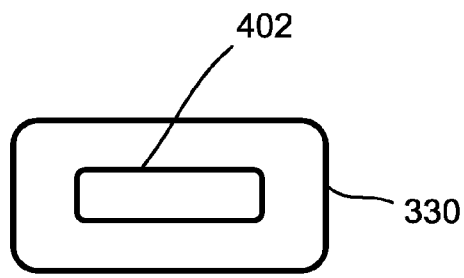
FIG. 4A depicts a cross section of a mouthpiece including an example of an air passageway consistent with implementations of the current subject matter.
Figure 4B:
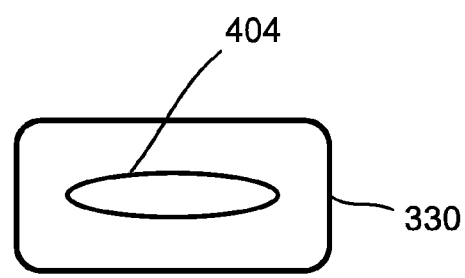
FIG. 4B depicts a cross section of a mouthpiece including another example of an air passageway consistent with implementations of the current subject matter.
Figure 4C:
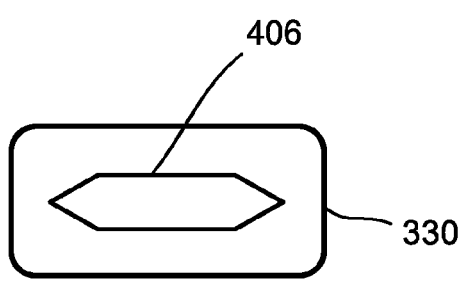
FIG. 4C depicts a cross section of a mouthpiece including another example of an air passageway consistent with implementations of the current subject matter.
Figure 4D:
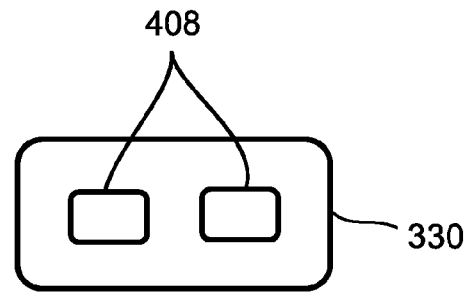
FIG. 4D depicts a cross section of a mouthpiece including another example of an air passageway consistent with implementations of the current subject matter.

FIGS. 4A-D depict a cross section of the mouthpiece 330 including various examples of the air passageway 332. In some implementations of the current subject matter, the air passageway 332 can include one or more apertures. Moreover, the shape and/or dimensions of the air passageway 332, including the shape and/or dimensions of each of the one or more apertures, can be configured to allow a very particular volume of airflow from a user puffing on the mouthpiece 330. For example, the air passageway 332 can include an aperture 402 having a rectangular (e.g., square) cross section (e.g., as shown in FIG. 4A), an aperture 404 having an elliptical (e.g., circular) cross section (e.g., as shown in FIG. 4B), an aperture 406 having a polyhedral cross section (e.g., as shown in FIG. 4C), or multiple apertures 408 of any shape (e.g., as shown in FIG. 4D). The dimension and/or shape of the aperture forming the air passageway 332 of the mouthpiece 330 can also provide a familiar design, form or logo, so as to indicate a source of the vaporizer cartridge 320, for example. Such size and/or shape can also accommodate a light source, as described above.

Figure 5:
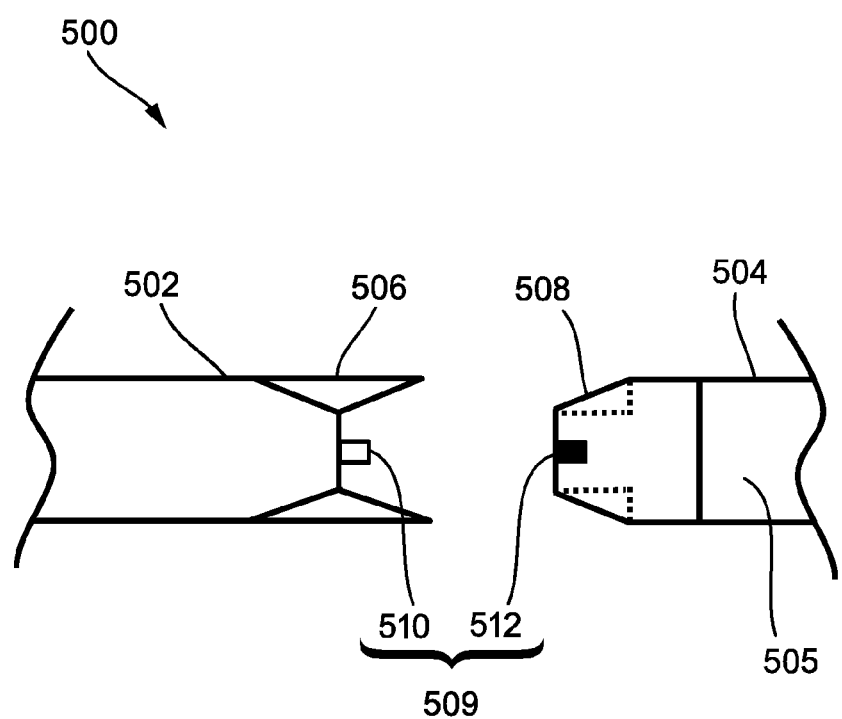
FIG. 5 depicts a block diagram illustrating an example of a vaporizer having an electrical and mechanical connection between a vaporizer body and a vaporizer cartridge consistent with implementations of the current subject matter.

FIG. 5 depicts a block diagram illustrating an example of the vaporizer 500 having an electrical and mechanical connection between the vaporizer body 502 and the vaporizer cartridge 504 consistent with implementations of the current subject matter. As shown in FIG. 5, in some implementations of the current subject matter, neither the vaporizer body 502 nor the vaporizer cartridge 504 utilizes a receptacle for receiving at least a portion of the other. Instead, the vaporizer body 502, which is substantially similar to vaporizer bodies described above, includes one or more body electrical contacts 506 configured to mate, for example, in face-to-face or interlocking manner, with one or more cartridge electrical contacts 508 in the cartridge 504. As illustrated in FIG. 5, the one or more body electrical contacts 506 can include two angled surfaces, and which are symmetrical, so as to be able to mate with the one or more cartridge electrical contacts 508 in any one of two reversible orientations. The coupling of the one or more body electrical contacts 506 and the one or more cartridge electrical contacts 508 can form an electrical connection between the vaporizer body 502 and the cartridge 504. For example, the coupling of the one or more body electrical contracts 506 and the one or more cartridge electrical contacts 508 can form a circuit including the controller 104 and the power source 112 included in the vaporizer body 502, and the heating element included in the atomizer 505 of the cartridge 504. The circuit can allow the controller 104 to control the discharge of electrical current from the power source 112 to the heating element included in the atomizer 505.

To facilitate a stable electrical as well as physical connection, a mechanical connection mechanism 509 can include a body connector 510 in the vaporizer body 502 that is configured to mate and connect with a cartridge connector 512 in the cartridge 504. In some implementations of the current subject matter, the body connector 510 can be a male portion, such as a protrusion, flange, latch, pin, ledge, ridge, or the like, while the cartridge connector 512 can be a female portion, such as a groove, a channel, an aperture, an inwardly directed latch, a pinhole, or the like. Further still, each of the vaporizer body 502 and/or the vaporizer cartridge 504 can include one or more magnets, preferably positioned to align against each other when connected, so as to maintain physical connection, and resultant electrical connection, between the vaporizer body 502 and the vaporizer cartridge 504.

In some instances, the vaporizer 100, such as any of variations of the vaporizer 100 described herein, can run out of electrical charge, i.e. have its battery run low or depleted, such that the vaporizer 100 has insufficient charge to heat and vaporize the vaporizable material included in the reservoir 140. In some of these instances, the user of the vaporizer 100 may not possess or have access to a charging device or charge cradle for charging the battery of the vaporizer 100.

Figure 6A:
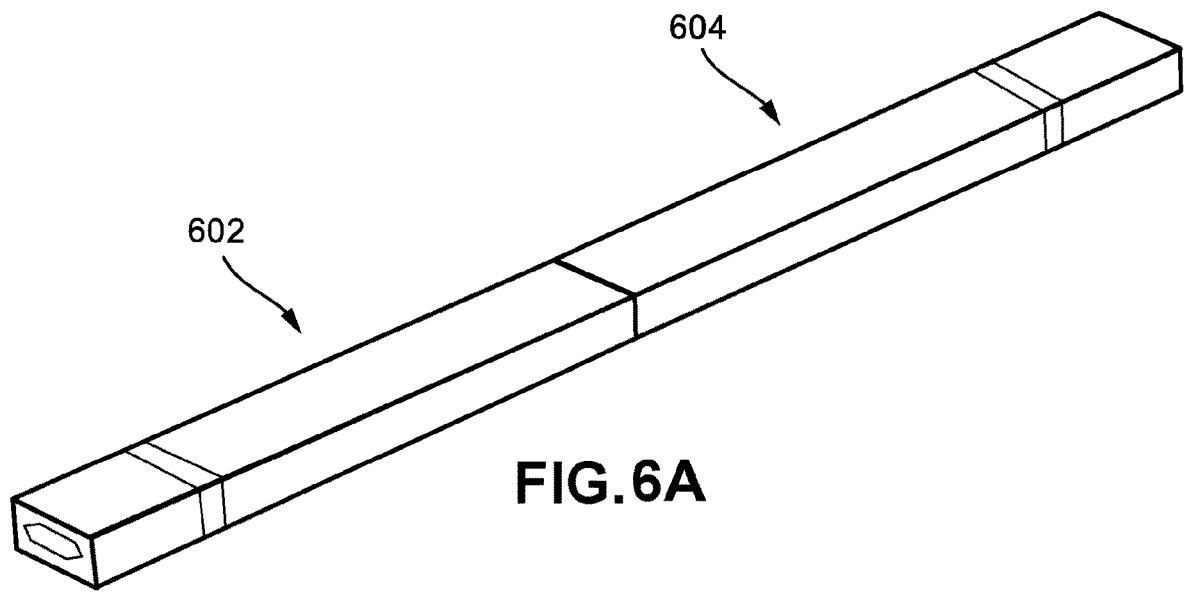
FIG. 6A depicts an example of power sharing between multiple vaporizers consistent with implementations of the current subject matter.
Figure 6B:
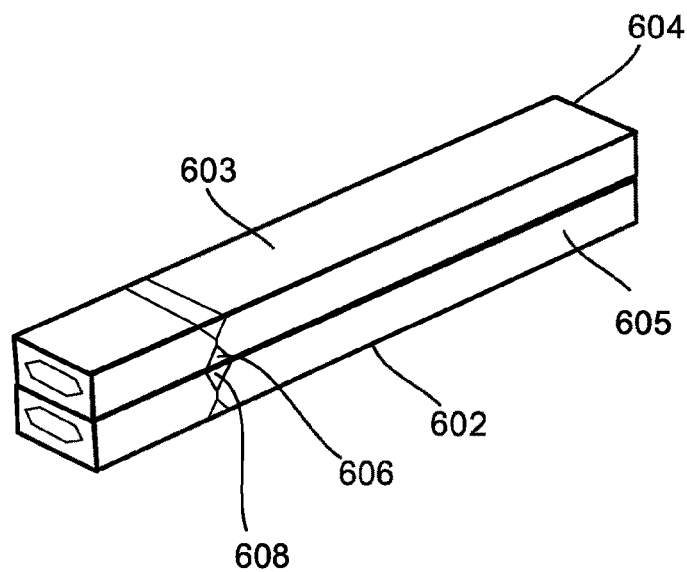
FIG. 6B depicts another example of power sharing between multiple vaporizers consistent with implementations of the current subject matter.

Accordingly, in some implementations of the current subject matter, the vaporizer 100 can be charged through power sharing, shared charging, or reverse charging in which another device, such as another vaporizer, a smartphone, a tablet computer, and/or the like, serves as a power source charging the vaporizer 100, either via a wired connection or a wireless connection. To further illustrate, FIGS. 6A-B, depicts examples of power sharing between multiple vaporizers consistent with implementations of the current subject. As shown in FIGS. 6A-B, a first vaporizer 602 can be paired with a second vaporizer 604 to receive a charge from the second vaporizer device 604. The pairing can include a physical pairing, i.e. a mating of one or more body electrical contacts of the first vaporizer device 602 with corresponding one or more body electrical contacts of the second vaporizer device, and which mating of the electrical contacts allows an electric charge to flow from the second vaporizer 604 to the first vaporizer 602 via the mated electrical contacts. The mating can also be aided by one or more physical mating or connecting elements, such as magnetics, ridges, grooves, slots, protrusions, pins, tabs, flanges, or the like, which can be integrated with, extending from, embedded in, extending into, or flush with a vaporizer body 603, 604 of vaporizers 602, 604, respectively.

As shown in FIGS. 6A and 6B, the mating between the first vaporizer 602 and the second vaporizer 604 can occur as between their electrical contacts that are located at a distal end of the vaporizers, as shown. Accordingly, the vaporizers can be connected together in a manner where charge from the second vaporizer 604 can be shared with the first vaporizer 602, assuming proper alignment and connection (either by electrical contacts and/or connection mechanism such as magnets).

In some exemplary implementations of the current subject matter as shown in FIG. 6B, each vaporizer 602, 604 includes a vaporizer body 603, 605, respectively, which includes body electrical contacts 606, 608, respectively. The body electrical contacts 606, 608 are normally configured to mate with a charging unit, such as a charge pad, charge cradle, or other charging element that is connected with an electricity source for charging a vaporizer when not being used. In the case where one of the vaporizers, i.e., first vaporizer 602, is depleted of charge and it is desired to be used, the first vaporizer 602 can be mated with second vaporizer 604 to receive a limited charge from the second vaporizer 604 via body electrical contacts 606, 608. In some implementations of the current subject matter, the body charge contacts can be formed in accordance with an electrical standard, such as the Universal Serial Bus (USB) standard, or the like.

In some implementations of the current subject matter, the charge transferred from the second vaporizer 604 to the first vaporizer 602 can be limited to a threshold amount of charge, and which limit can be measured in mA-hours or other capacity measurement. For example, in some instances, the threshold amount can be calculated or calibrated to allow a user of the first vaporizer 602 a predetermined number of puffs on the first vaporizer 602, and which puffs can be calculated based on a historical puff volume or time duration by the user or other measured data. In other implementations of the current subject matter the first and second vaporizers 602, 604 can be configured, by logic or controller circuitry, to exchange an amount of charge such that each of the first and second vaporizer 602, 604 has a substantially equal amount of charge. Further still, second vaporizer 604 can be configured so as to only provide a certain percentage of its charge to first vaporizer 602, and which percentage can be measured from either total capacity charge, charge remaining on the second vaporizer 604, or other measurement.

To effectuate a charge transfer, each of the first vaporizer 602 and the second vaporizer can include a charge controller, which can be implemented in logic circuitry on a printed circuit board (PCB), in software as executed by a microprocessor, in firmware, or any combination thereof. The charge controller can be coupled between a battery of each vaporizer and its body electrical contacts, to control and meter the amount of charge exchanged therebetween. In some implementations of the current subject matter and as an example, the charge controller of the first vaporizer 602 can be configured to determine when the first vaporizer 602 is in need of a charge, so as to in turn configure the first vaporizer 602 as a recipient device of the exchange of electrical charge. Likewise, the charge controller of the second vaporizer 604 can be configured to determine that it has sufficient charge, so as to in turn configure the second vaporizer 604 as a donor of electrical charge.

In some implementations of the current subject matter, the designation of a vaporizer as either a donor or a recipient can be made a priori according to a coupling of the first vaporizer 602 with the second vaporizer 604 and/or according to a respective configuration of the first vaporizer 602 and the second vaporizer 604. Each of the first vaporizer 602 and the second vaporizer 604 may be configured to generate one or more outputs (e.g., visual outputs, audio outputs, haptic outputs, and/or the like) corresponding to the designation. For example, the first vaporizer 602 may generate a first output in response to being designated a donor while the second vaporizer 604 may generate a second output in response to being designated a recipient.

The pairing between the first vaporizer 602 and the second vaporizer 604 can be made or established through a logical configuration made via any of a number of communication protocols, such as Bluetooth, Near Field Communication (NFC), or even via the same or extra body electrical contacts. For example, each vaporizer can include two or more body electrical contacts, such as four, and each electrical contact can be designated as either a charge contact or a data contact. In an exemplary implementation, each vaporizer can include four body electrical contacts, two of which are for negative and positive charge transfer, and the other two are reserved for digital data transfer, between the vaporizers.

In some implementations of the current subject matter, the designation of each of the first vaporizer 602 and the second vaporizer 604 as a donor or a recipient may be performed via one or more devices coupled with the first vaporizer 602 and the second vaporizer 604. For example, the first vaporizer 602 may be communicative coupled with a mobile device (e.g., a smartphone, a tablet computer, and/or the like). The first vaporizer 602 may be designated as a donor (or a recipient) via a user interface presented on the mobile device by, for example, a mobile application associated with the first vaporizer 602. For instance, a user of the first vaporizer 602 may designate, by one or more selections made via the user interface, the first vaporizer 602 as a donor by at least activating a reverse charging functionality at the first vaporizer 602. Alternatively and/or additionally, the user of the first vaporizer 602 may designate, by one or more selections made via the user interface, the first vaporizer 602 as a recipient by at least deactivating a reverse charging functionality at the first vaporizer 602. It should be appreciated that although the first vaporizer 602 and the second vaporizer 604 may be designated as a donor and a recipient, reverse charging between the first vaporizer 602 and the second vaporizer 604 may not commence until the first vaporizer 602 and the second vaporizer 604 are in sufficient proximity to one another (e.g., less than a threshold distance apart).

In some implementations of the current subject matter, the designation of each of the first vaporizer 602 and the second vaporizer 604 as a donor or a recipient may be performed based on an orientation of at least one of the first vaporizer 602 and the second vaporizer 604. For example, the first vaporizer 602 and the second vaporizer 604 may each include one or more sensors (e.g., motion sensor, accelerometer, and/or the like) capable of determining a respective orientation of the first vaporizer 602 and the second vaporizer 604. Accordingly, the first vaporizer 602 may be designated, for example, as a donor by being placed in a first orientation associated with an activation of the reverse charging functionality at the first vaporizer 602 while the second vaporizer 604 may be designated as a recipient by being placed in a second orientation associated with a deactivation of the reverse charging functionality at the second vaporizer 604.

The first orientation and the second orientation may be different and/or complementary. For instance, the reverse charging functionality at the first vaporizer 602 may be activated in response to one surface on the first vaporizer 602 being placed upward (or downward) whereas the reverse charging functionality at the second vaporizer device 604 may be deactivated in response to an opposite surface on the second vaporizer device 604 being placed upward (or downward). Moreover, reverse charging between the first vaporizer 602 and the second vaporizer 604 may not commence until the first vaporizer 602 and the second vaporizer 604 are in sufficient proximity to one another. To further illustrate, in the example shown in FIG. 6B, the first vaporizer 602 and the second vaporizer 604 may engage in reverse charging in response to the first vaporizer 602 being placed front side down (e.g., a front surface of the first vaporizer 602 facing downward) with the second vaporizer 604 being placed front side up (e.g., a front surface of the second vaporizer 604 facing upward) on top of the first vaporizer 602 (e.g., with the back surface of the first vaporizer 602 in sufficient proximity to and/or at least partially contacting the back surface of the second vaporizer 604).

Alternatively and/or additionally, designation of each of the first vaporizer 602 and the second vaporizer 604 as a donor and a recipient may be determined based at least on one or more haptic inputs including, for example, taps, shakes, and/or the like. For example, the reverse charging functionality at the first vaporizer 602 may be activated in response to a first haptic input received at the first vaporizer 602 while the reverse charging functionality at the second vaporizer device 604 may be deactivated in response to a second haptic input received at the second vaporizer 604. Nevertheless, as noted, reverse charging between the first vaporizer 602 and the second vaporizer 604 may not commence until the first vaporizer 602 and the second vaporizer 604 are in sufficient proximity to one another.

In some implementations of the current subject matter, each of the first vaporizer 602 and the second vaporizer 604 can further include a converter circuit for adjusting a charge for proper transfer. For instance, the charge circuit may include a charge boosting circuit to boost a charge from the battery from 3.7 volts (the voltage that might be necessary to charge a cartridge's heating element during a puff) to 5 volts (a standard voltage necessary for charging or recharging a battery). While these voltages are provided as examples, those of skill in the art would recognize that other voltages can be used. For example, each of the first and second vaporizer 602, 604 may include induction charging, either in addition to, or in lieu of, the body electrical contacts, and such induction may require different charging parameters, such as voltage, induction levels, connection types (i.e., to properly align induction circuits between the vaporizers 602, 604), or other parameters.

Pairing of the first vaporizer 602 and the second vaporizer 604 can be performed based on device identification (ID), user ID, and/or can also be established using an intermediate device, such as the users' mobile device, such as a mobile computing device, phone, etc. The mobile device can execute a specialized application ("app") to perform the functions described herein. For instance, in some cases a user of a vaporizer as described herein must pair their vaporizer with a mobile device, such as their mobile phone. The pairing can include communication between the vaporizer and the mobile device, such as on a Bluetooth channel, a WIFI channel, or even via a cellular transceiver. Once so paired with a mobile device, a vaporizer can be paired with another vaporizer by actions taken on the respective paired mobile devices by the respective users, such that the mobile devices may communicate some pairing information, including but not limited to, recipient and donor designations or configurations, charge limits or thresholds, and control signals for controlling the charge circuitry of the respective vaporizer.

Figure 7A:
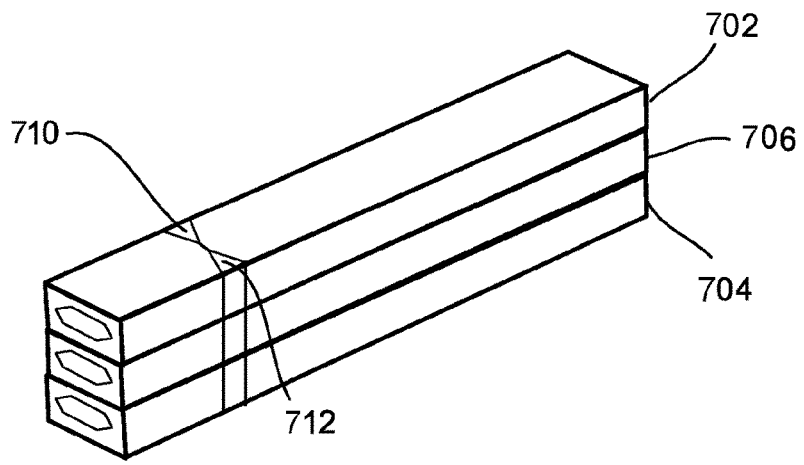
FIG. 7A depicts another example of power sharing between multiple vaporizers consistent with implementations of the current subject matter.
Figure 7B:
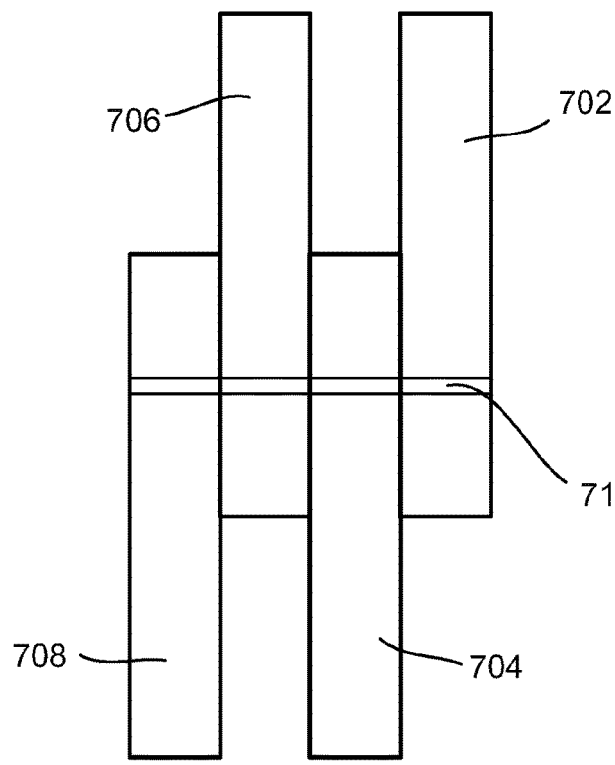
FIG. 7B depicts another example of power sharing between multiple vaporizers consistent with implementations of the current subject matter.
Figure 7C:
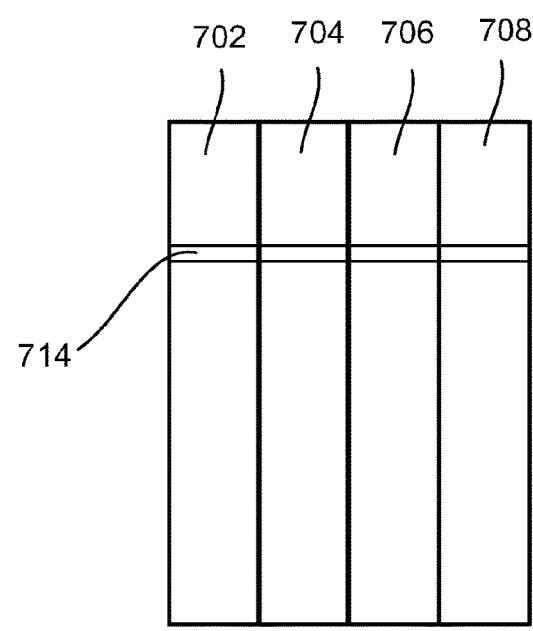
FIG. 7C depicts another example of power sharing between multiple vaporizers consistent with implementations of the current subject matter.

In some implementations of the current subject matter, as shown in FIGS. 7A-C, more than two vaporizers can be connected together for sharing a charge. For instance, as shown in FIG. 7A, three vaporizers 702, 704 and 706, can be mated or connected together by their body electrical contacts 710 and 712 (or wireless), and share charge among them through the electrical contacts 710 and 712 (or by wireless inductive charging). Or, one of the three vaporizers, third vaporizer 706, can be designated as a pass-through device, by being configured to receive charge from a second vaporizer 704, and transferring the charge to a first vaporizer 702. Such pass-through of charge can occur with or without storing at least some of that charge on the third vaporizer's battery.

As shown in FIG. 7B, a number of vaporizers, in the example shown four vaporizers, 702, 704, 706, and 708, can be connected together, where to achieve the correct connection and electrical polarity, the vaporizers can be connected to one or more other vaporizers in an orientation that is 180 degrees opposite, either linearly or latitudinally, such that the electrical contacts (such as electrical contact 714) of each connected vaporizer can fit within a chain of vaporizers for effective share charging.

Further still, as shown in FIG. 7C, a number of vaporizers, such as four vaporizers, 702, 704, 706, and 708, can be connected together in a side-by-side arrangement, in which each vaporizer of the number of vaporizers are aligned in the same orientation. One or more of the vaporizers can also be designated as pass-through devices to transfer a charge through the body electrical contact (e.g., electrical contact 714) from a donor vaporizer (e.g., first vaporizer 702) to a recipient vaporizer (e.g., vaporizers 704, 706, and 708), while allowing other signals to possibly be transferred between the vaporizers.

Figure 8:
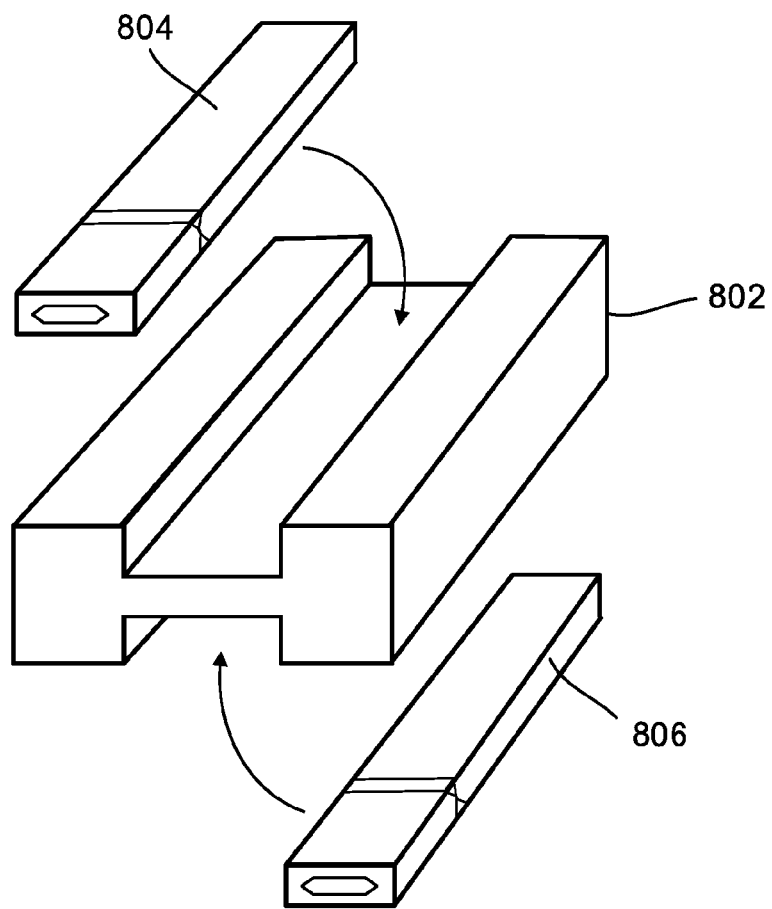
FIG. 8 depicts a perspective view of an example of a charge transfer hub consistent with implementations of the current subject matter.

In some implementations of the current subject matter as shown in FIG. 8, a charge transfer hub 802 can be provided, to which two or more vaporizers, such as vaporizers 804 and 806, can be connected. The charge transfer hub 802 can be a simple electrical conduit between two vaporizers, or a switchable conduit between three or more vaporizers. Accordingly, the charge transfer hub 802 can include logic circuits and/or control software that can switch on or off various electrical contacts based on a designation as being mated to a donor or recipient vaporizer. Such designation can be communicated from the vaporizers (or from a mobile device such as a smartphone, tablet computer, and/or the like) to the charge transfer hub 802, via Bluetooth, WIFI, or cellular transceiver, or the like. In still further implementations of the current subject matter the charge transfer hub 802 can have its own battery source. The electrical contacts of the charge transfer hub 802 can include data contacts to receive data, such as a vaporizer ID, so as to allow connection and charge transfer with verified and approved vaporizers.

The rate of charging, and therefore the time needed to mate, can be controlled. In some implementations of the current subject matter, it may be desirable for a charge transfer to occur quickly. i.e. under 10 seconds, and more preferably, within 1 or 2 seconds. Yet, a longer time for the transfer can be configured. During the charge transfer, the vaporizers, or their proxy mobile devices, can exchange other information, such as user ID, vaporizer operation, and use data, such as cartridge flavor, amount of vaporization, or the like.

When a first vaporizer is mated with a second vaporizer, and a charge is transferred therebetween, either the first vaporizer and/or the second vaporizer can record the charge transfer as a transaction, for storage in a memory, for example, or send the transaction data to a mobile device associated with either vaporizer. Accordingly, interactions among pairs of vaporizers can be recorded and tracked, and data about these interactions can be processed, shared, or otherwise communicated to any of a number of designated parties. In this way, the sharing of a charge can be used as a social or social networking event.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present.

Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" are intended to include the plural forms as well, unless the context clearly indicates otherwise. It will be further understood that the terms "comprises" and/or "comprising." when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A. B. and C;" "one or more of A, B, and C;" and "A, B, and/or C" are each intended to mean "A alone, B alone, C alone, A and B together. A and C together, B and C together, or A and B and C together." Use of the term "based on." above and in the claims is intended to mean. "based at least in part on." such that an unrecited feature or element is also permissible.

Spatially relative terms, such as "forward", "rearward", "under", "below". "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately." even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10)" is also disclosed. Any numerical range recited herein is intended to include all sub-ranges subsumed therein. It is also understood that when a value is disclosed that "less than or equal to" the value. "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the teachings herein. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the claims.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the following, further features, characteristics, and advantages of various implementations of the current subject matter will be described by means of items.

Item 1. A vaporizer, comprising: a vaporizer body configured to couple with a vaporizer cartridge including a vaporizable material, the vaporizer body including a first power source configured to discharge a current to a heating element in order to cause a vaporization of at least a portion of the vaporizable material included in the vaporizer cartridge by at least increasing a temperature of the heating element, and the vaporizer configured to engage in a reverse charging with a device in which the first power source of the vaporizer charges or is charged by a second power source at the device.

Item 2. The vaporizer of item 1, wherein the device comprises another vaporizer or a mobile device.

Item 3. The vaporizer of any of items 1-2, wherein the vaporizer is configured to engage in the reverse charging in response to a pairing being established between the vaporizer and the device.

Item 4. The vaporizer of item 3, wherein the pairing is established based at least one of a first identifier of the vaporizer, a second identifier of the device, or a third identifier of a user associated with the vaporizer and/or the device.

Item 5. The vaporizer of any of items 3-4, wherein the pairing is established by another device coupled with the vaporizer and/or the device.

Item 6. The vaporizer of any of items 1-5, wherein the vaporizer is configured to engage in the reverse charging in response to the vaporizer being less than a threshold distance apart from the device.

Item 7. The vaporizer of any of items 1-6, wherein the vaporizer is configured to engage in the reverse charging in response to the vaporizer being designated a donor or a recipient in the reverse charging.

Item 8. The vaporizer of item 7, wherein the vaporizer is designated the donor in the reverse charging in response to the vaporizer being in a first orientation, and wherein the vaporizer is designated the recipient in the reverse charging in response to the vaporizer being in the second orientation.

Item 9. The vaporizer of item 8, wherein the vaporizer body further includes one or more sensors for detecting when the vaporizer is in the first orientation or the second orientation.

Item 10. The vaporizer of any of items 7-9, wherein the vaporizer is further configured to couple with another device, and wherein the vaporizer is designated the donor or the recipient in the reverse charging in response to one or more inputs received at the other device.

Item 11. The vaporizer of any of items 7-10, wherein the vaporizer body further includes an output device configured to generate at least one of a visual output, an audio output, or a haptic output corresponding to a designation of the vaporizer as the donor or the recipient in the reverse charging.

Item 12. The vaporizer of any of items 1-11, wherein a threshold quantity of charge is transferred between the vaporizer and the device engaged in the reverse charging.

Item 13. The vaporizer of item 12, wherein the threshold quantity of charge is determined based at least on a first quantity of charge available or required at the vaporizer.

Item 14. The vaporizer of any of items 12-13, wherein the threshold quantity of charge is determined based at least on a second quantity of charge available or required at the device.

Item 15. The vaporizer of any of items 1-14, wherein the vaporizer and the device engage in the reverse charging via one or more electrical contacts coupling the vaporizer and the device.

Item 16. The vaporizer of any of items 1-15, wherein the vaporizer and the device engage in the reverse charging via wireless inductive charging.

Item 17. The vaporizer of any of items 1-16, wherein the vaporizer and the device engage in the reverse charging with another device, and wherein the reverse charging includes the other device receiving a charge from one of the vaporizer and the device.

Item 18. The vaporizer of item 17, wherein the reverse charging further includes the other device transferring a first portion of the charge to the other one of the vaporizer and the device.

Item 19. The vaporizer of any of items 17-18, wherein the reverse charging further includes the other device storing a second portion of the charge at the other device.

Item 20. The vaporizer of any of items 1-19, wherein the vaporizer body further includes a converter circuit configured to adjust an output voltage of the first power source at the vaporizer based at least on an input voltage of the second power source at the device.

Item 21. A method, comprising: reverse charging a vaporizer comprising a vaporizer body configured to couple with a vaporizer cartridge including a vaporizable material, the vaporizer body including a first power source configured to discharge a current to a heating element in order to cause a vaporization of at least a portion of the vaporizable material included in the vaporizer cartridge by at least increasing a temperature of the heating element, and the reverse charging of the vaporizer includes the first power source of the vaporizer charging or being charged by a second power source at the device.

Item 22. The method of item 21, wherein the device comprises another vaporizer or a mobile device.

Item 23. The method of any of items 21-22, further comprising engaging in the reverse charging in response to a pairing being established between the vaporizer and the device.

Item 24. The method of item 23, wherein the pairing is established based at least one of a first identifier of the vaporizer, a second identifier of the device, or a third identifier of a user associated with the vaporizer and/or the device.

Item 25. The method of any of items 23-24, wherein the pairing is established by another device coupled with the vaporizer and/or the device.

Item 26. The method of any of items 21-24, further comprising engaging in the reverse charging in response to the vaporizer being less than a threshold distance apart from the device.

Item 27. The method of any of items 21-25, further comprising engaging in the reverse charging in response to the vaporizer being designated a donor or a recipient in the reverse charging.

Item 28. The method of item 27, wherein the vaporizer is designated the donor in the reverse charging in response to the vaporizer being in a first orientation, and wherein the vaporizer is designated the recipient in the reverse charging in response to the vaporizer being in the second orientation.

Item 29. The method of item 28, wherein the vaporizer body further includes one or more sensors for detecting when the vaporizer is in the first orientation or the second orientation.

Item 30. The method of any of items 27-29, further comprising: receiving, from another device coupled with the vaporizer, one or more inputs, and designating the vaporizer as the donor or the recipient in the reverse charging in response to the one or more inputs received at the other device.

Item 31. The method of any of items 27-30, further comprising generating, by an output device at the vaporizer, at least one of a visual output, an audio output, or a haptic output corresponding to a designation of the vaporizer as the donor or the recipient in the reverse charging.

Item 32. The method of any of items 21-31, further comprising transferring a threshold quantity of charge between the vaporizer and the device engaged in the reverse charging.

Item 33. The method of item 32, wherein the threshold quantity of charge is determined based at least on a first quantity of charge available or required at the vaporizer.

Item 34. The method of any of items 32-33, wherein the threshold quantity of charge is determined based at least on a second quantity of charge available or required at the device.

Item 35. The method of any of items 21-34, wherein the vaporizer and the device engage in the reverse charging via one or more electrical contacts coupling the vaporizer and the device.

Item 36. The method of any of items 21-35, wherein the vaporizer and the device engage in the reverse charging via wireless inductive charging.

Item 37. The method of any of items 21-36, wherein the vaporizer and the device engage in the reverse charging with another device, and wherein the reverse charging includes the other device receiving a charge from one of the vaporizer and the device.

Item 38. The method of item 37, wherein the reverse charging further includes the other device transferring a first portion of the charge to the other one of the vaporizer and the device.

Item 39. The method of any of items 37-38, wherein the reverse charging further includes the other device storing a second portion of the charge at the other device.

Item 40. The method of any of items 21-39, further comprising adjusting, by a converter circuit at the vaporizer, an output voltage of the first power source at the vaporizer based at least on an input voltage of the second power source at the device.

Item 41. A system, comprising: a device; and a vaporizer comprising a vaporizer body configured to couple with a vaporizer cartridge including a vaporizable material, the vaporizer body including a first power source configured to discharge a current to a heating element in order to cause a vaporization of at least a portion of the vaporizable material included in the vaporizer cartridge by at least increasing a temperature of the heating element, and the vaporizer configured to engage in a reverse charging with the device in which the first power source of the vaporizer charges or is charged by a second power source at the device.

Item 42. The system of item 41, wherein the device comprises another vaporizer or a mobile device.

Item 43. The system of any of items 41-42, wherein the vaporizer is configured to engage in the reverse charging in response to a pairing being established between the vaporizer and the device.

Item 44. The system of item 43, wherein the pairing is established based at least one of a first identifier of the vaporizer, a second identifier of the device, or a third identifier of a user associated with the vaporizer and/or the device.

Item 45. The system of any of items 43-44, wherein the pairing is established by another device coupled with the vaporizer and/or the device.

Item 46. The system of any of items 41-45, wherein the vaporizer is configured to engage in the reverse charging in response to the vaporizer being less than a threshold distance apart from the device.

Item 47. The system of any of items 41-46, wherein the vaporizer is configured to engage in the reverse charging in response to the vaporizer being designated a donor or a recipient in the reverse charging.

Item 48. The system of item 47, wherein the vaporizer is designated the donor in the reverse charging in response to the vaporizer being in a first orientation, and wherein the vaporizer is designated the recipient in the reverse charging in response to the vaporizer being in the second orientation.

Item 49. The system of item 48, wherein the vaporizer body further includes one or more sensors for detecting when the vaporizer is in the first orientation or the second orientation.

Item 50. The system of any of items 47-49, wherein the vaporizer is further configured to couple with another device, and wherein the vaporizer is designated the donor or the recipient in the reverse charging in response to one or more inputs received at the other device.

Item 51. The system of any of items 47-50, wherein the vaporizer body further includes an output device configured to generate at least one of a visual output, an audio output, or a haptic output corresponding to a designation of the vaporizer as the donor or the recipient in the reverse charging.

Item 52. The system of any of items 41-51, wherein a threshold quantity of charge is transferred between the vaporizer and the device engaged in the reverse charging.

Item 53. The system of item 52, wherein the threshold quantity of charge is determined based at least on a first quantity of charge available or required at the vaporizer.

Item 54. The system of any of items 52-53, wherein the threshold quantity of charge is determined based at least on a second quantity of charge available or required at the device.

Item 55. The system of any of items 41-54, wherein the vaporizer and the device engage in the reverse charging via one or more electrical contacts coupling the vaporizer and the device.

Item 56. The system of any of items 41-55, wherein the vaporizer and the device engage in the reverse charging via wireless inductive charging.

Item 57. The system of any of items 41-56, wherein the vaporizer and the device engage in the reverse charging with another device, and wherein the reverse charging includes the other device receiving a charge from one of the vaporizer and the device.

Item 58. The system of item 57, wherein the reverse charging further includes the other device transferring a first portion of the charge to the other one of the vaporizer and the device.

Item 59. The system of any of items 57-59, wherein the reverse charging further includes the other device storing a second portion of the charge at the other device.

Item 60. The system of any of items 41-59, wherein the vaporizer body further includes a converter circuit configured to adjust an output voltage of the first power source at the vaporizer based at least on an input voltage of the second power source at the device.

What is claimed is:

1. A vaporizer, comprising:
a vaporizer body configured to couple with a vaporizer cartridge including a vaporizable material, the vaporizer body including a first power source configured to discharge a current to a heating element electrically connected to the first power source in order to cause a vaporization of at least a portion of the vaporizable material included in the vaporizer cartridge by at least increasing a temperature of the heating element,
wherein the vaporizer is configured to engage in a reverse charging with a device in which the first power source of the vaporizer charges or is charged by a second power source at the device; and
wherein a threshold quantity of charge is transferred between the vaporizer and the device engaged in the reverse charging, and
wherein the threshold quantity of charge is calculated by a controller, based on measured data including at least one of historical puff volume and time duration by a user to provide a predetermined number of puffs on the vaporizer, the controller in electrical communication with at least the first power source.

2. The vaporizer of claim 1, wherein the device comprises another vaporizer or a mobile device.

3. The vaporizer of claim 1, wherein the vaporizer is configured to engage in the reverse charging in response to a pairing being established between the vaporizer and the device.

4. The vaporizer of claim 3, wherein the pairing is established based on at least one of a first identifier of the vaporizer, a second identifier of the device, or a third identifier of a user associated with the vaporizer and/or the device.

5. The vaporizer of claim 3, wherein the pairing is established by another device coupled with the vaporizer and/or the device.

6. The vaporizer of claim 1, wherein the vaporizer is configured to engage in the reverse charging in response to the vaporizer being less than a threshold distance apart from the device.

7. The vaporizer of claim 1, wherein the vaporizer is configured to engage in the reverse charging in response to the vaporizer being designated a donor or a recipient in the reverse charging.

8. The vaporizer of claim 7, wherein the vaporizer is designated the donor in the reverse charging in response to the vaporizer being in a first orientation, and wherein the vaporizer is designated the recipient in the reverse charging in response to the vaporizer being in the second orientation.

9. The vaporizer of claim 8, wherein the vaporizer body further includes one or more sensors for detecting when the vaporizer is in the first orientation or the second orientation.

10. The vaporizer of claim 7, wherein the vaporizer is further configured to couple with another device, and wherein the vaporizer is designated the donor or the recipient in the reverse charging in response to one or more inputs received at the other device.

11. The vaporizer of claim 7, wherein the vaporizer body further includes an output device configured to generate at least one of a visual output, an audio output, or a haptic output corresponding to a designation of the vaporizer as the donor or the recipient in the reverse charging.

12. The vaporizer of claim 1, wherein the threshold quantity of charge is determined based at least on a first quantity of charge available or required at the vaporizer.

13. The vaporizer of claim 1, wherein the threshold quantity of charge is determined based at least on a second quantity of charge available or required at the device.

14. The vaporizer of claim 1, wherein the vaporizer and the device engage in the reverse charging via one or more electrical contacts coupling the vaporizer and the device.

15. The vaporizer of claim 1, wherein the vaporizer and the device engage in the reverse charging via wireless inductive charging.

16. The vaporizer of claim 1, wherein the vaporizer and the device engage in the reverse charging with another device, and wherein the reverse charging includes the other device receiving a charge from one of the vaporizer and the device.

17. The vaporizer of claim 16, wherein the reverse charging further includes the other device transferring a first portion of the charge to the other one of the vaporizer and the device.

18. The vaporizer of claim 17, wherein the reverse charging further includes the other device storing a second portion of the charge at the other device.

19. A method for charging a vaporizer, comprising:
reverse charging a vaporizer comprising a vaporizer body configured to couple with a vaporizer cartridge including a vaporizable material, the vaporizer body including a first power source configured to discharge a current to a heating element in order to cause a vaporization of at least a portion of the vaporizable material included in the vaporizer cartridge by at least increasing a temperature of the heating element, wherein the heating element is electrically connected to the first power source, and the reverse charging of the vaporizer includes the first power source of the vaporizer charging or being charged by a second power source at a device; and wherein a threshold quantity of charge is transferred between the vaporizer and the device engaged in the reverse charging, and wherein the threshold quantity of charge is calculated by a controller, based on measured data including at least one of historical puff volume and time duration by a user to provide a predetermined number of puffs on the vaporizer, the controller in electrical communication with at least the first power source.

* * * * *